US012289240B2

(12) United States Patent
Kommula et al.

(10) Patent No.: US 12,289,240 B2
(45) Date of Patent: *Apr. 29, 2025

(54) DYNAMIC SERVICE REBALANCING IN NETWORK INTERFACE CARDS HAVING PROCESSING UNITS

(71) Applicant: Juniper Networks, Inc., Sunnyvale, CA (US)

(72) Inventors: Raja Kommula, Cupertino, CA (US); Ganesh Byagoti Matad Sunkada, Bengaluru (IN); Thayumanavan Sridhar, Sunnyvale, CA (US); Raj Yavatkar, Los Gatos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 18 days.

This patent is subject to a terminal disclaimer.

(21) Appl. No.: 18/316,668

(22) Filed: May 12, 2023

(65) Prior Publication Data

US 2024/0380701 A1    Nov. 14, 2024

(51) Int. Cl.
*H04L 47/2408* (2022.01)
*H04L 45/12* (2022.01)
(Continued)

(52) U.S. Cl.
CPC ........ *H04L 47/2408* (2013.01); *H04L 45/124* (2013.01); *H04L 47/125* (2013.01); *H04L 49/3063* (2013.01)

(58) Field of Classification Search
None
See application file for complete search history.

(56) References Cited

U.S. PATENT DOCUMENTS

| 6,141,705 A | 10/2000 | Anand et al. |
| RE37,811 E | 7/2002 | Sitbon et al. |

(Continued)

FOREIGN PATENT DOCUMENTS

WO    2013184846 A1    12/2013

OTHER PUBLICATIONS

Adarsh, "Autonomous and Predictive Systems to Enhance the Performance of Resilient Networks", University of California, Santa Barbara, Sep. 30, 2022, 268 pp.

(Continued)

*Primary Examiner* — June Sison
(74) *Attorney, Agent, or Firm* — Shumaker & Sieffert, P.A.

(57) ABSTRACT

An edge services controller may use a service scheduling algorithm to deploy services on Network Interface Cards (NICs) of a NIC fabric while incrementally scheduling services. The edge services controller may assign services to specific nodes depending on their available resources on these nodes. Available resources may include CPU compute, DPU compute, node bandwidth, etc. The edge services controller may also consider the distance between the services that communicate with each other (i.e., hop count between nodes if two communicating services are placed on separate nodes) and the weight of communication between the services. Two services that communicate heavily with each other may consume more bandwidth, and putting them further apart is more detrimental than keeping them closer to each other, i.e., reducing the hop count between each other depending on the bandwidth consumption due to their inter-service communications.

20 Claims, 10 Drawing Sheets

(51) Int. Cl.
*H04L 47/125* (2022.01)
*H04L 49/00* (2022.01)

(56) References Cited

U.S. PATENT DOCUMENTS

| | | | | |
|---|---|---|---|---|
| 9,571,391 | B2* | 2/2017 | Tsiatsis | H04L 61/10 |
| 11,968,251 | B1* | 4/2024 | Kommula | H04L 67/1008 |
| 2005/0120095 | A1 | 6/2005 | Aman et al. | |
| 2006/0136701 | A1 | 6/2006 | Dickinson | |
| 2018/0359544 | A1* | 12/2018 | Sagie | H04Q 11/0062 |
| 2019/0243691 | A1 | 8/2019 | LaBute et al. | |
| 2020/0019444 | A1* | 1/2020 | Rao | G06F 9/5016 |
| 2020/0106856 | A1* | 4/2020 | Megahed | H04L 41/145 |
| 2021/0004258 | A1 | 1/2021 | Liu | |
| 2021/0037363 | A1* | 2/2021 | Yang | H04L 41/5054 |
| 2021/0255899 | A1 | 8/2021 | Chen et al. | |
| 2022/0129316 | A1 | 4/2022 | Sheoran et al. | |
| 2022/0261661 | A1 | 8/2022 | Khaligh et al. | |
| 2022/0382593 | A1 | 12/2022 | Tootaghaj et al. | |
| 2022/0413941 | A1 | 12/2022 | Ramtekkar et al. | |
| 2023/0259429 | A1 | 8/2023 | Doddaiah et al. | |
| 2024/0020630 | A1 | 1/2024 | Post et al. | |
| 2024/0086217 | A1 | 3/2024 | Lev Ran et al. | |
| 2024/0184638 | A1 | 6/2024 | Kairali et al. | |
| 2024/0272930 | A1 | 8/2024 | Liu et al. | |
| 2024/0275846 | A1 | 8/2024 | Kommula et al. | |

OTHER PUBLICATIONS

Prosecution History from U.S. Appl. No. 18/064,803, dated Aug. 31, 2023 through Mar. 22, 2024, 36 pp.
Lappin, "Kubernetes Cost Optimization: How to Rebalance Fragmented Kubernetes Clusters to Reduce Cloud Costs," vmware.com, Dec. 15, 2020, 11 pp.
U.S. Appl. No. 18/064,803, filed Dec. 12, 2022, by Kommula et al.
Office Action from U.S. Appl. No. 18/640,970 dated Oct. 31, 2024, 27 pp.

* cited by examiner

DYNAMIC SERVICE REBALANCING IN NETWORK INTERFACE CARDS HAVING PROCESSING UNITS

TECHNICAL FIELD

The disclosure relates to computer networks.

BACKGROUND

In a typical cloud data center environment, there is a collection of interconnected servers that provide computing and/or storage capacity to run various applications. For example, a data center may comprise a facility that hosts applications and services for subscribers, i.e., customers of a data center provider. The data center may, for example, host all of the infrastructure equipment, such as networking and storage systems, redundant power supplies, and environmental controls. In a typical data center, clusters of storage servers and application servers (compute nodes) are interconnected via a high-speed switch fabric provided by one or more tiers of physical network switches and routers. More sophisticated data centers provide infrastructure spread throughout the world with subscriber support equipment located in various physical hosting facilities.

The connectivity between the server and the switch fabric occurs at a hardware module called the Network Interface Card (NIC). A conventional NIC includes an application-specific integrated circuit (ASIC) to perform packet forwarding, which includes some basic Layer 2/Layer 3 (L2/L3) functionality. In conventional NICs, the packet processing, policing and other advanced functionality, known as the "datapath" is performed by the host CPU, i.e., the CPU of the server that includes the NIC. As a result, the CPU resources in the server are shared by applications running on that server and also by datapath processing. For example, in a 4 core x86 server, one of the cores may be reserved for the datapath, leaving 3 cores (or 75% of CPU) for applications and the host operating system.

Some NIC vendors have begun including an additional processing unit in the NIC itself to offload at least some of the datapath processing from the host CPU to the NIC. The processing unit in the NIC may be, e.g., a multi-core ARM processor with some hardware acceleration provided by a Data Processing Unit (DPU), Field Programmable Gate Array (FPGA), and/or an ASIC. NICs that include such augmented datapath processing capabilities are typically referred to as SmartNICs.

SUMMARY

In general, techniques are described for an edge services controller that leverages processing units of NICs to augment the processing and networking functionality of a network of servers that include the NICs. Features provided by the edge services controller may include, e.g., orchestration of NICs; application programming interface (API) driven deployment of services on NICs; NIC addition, deletion and replacement; monitoring of services and other resources on NICs; and management of connectivity between various services running on the NICs. This disclosure describes techniques for dynamically deploying and rebalancing services on NICs in a NIC fabric.

The edge services controller may use a service scheduling algorithm to deploy services on NICs of a NIC fabric while also incrementally scheduling services. The edge services controller may also migrate services from NICs. Initially, the edge services controller may have a queue of services that need to be deployed in the given NIC fabric. The edge services controller may assign services to specific nodes depending on their available resources on these nodes. Available resources may include CPU compute, DPU compute, node bandwidth, etc. The edge services controller may also take into consideration the distance between services which communicate with each other (e.g., hop count between nodes if two communicating services are placed on separate nodes) and the weight of communication between the services. Two services that communicate heavily with each other may consume bandwidth along each hop and thus placing the two communicating services further apart from each other may be more detrimental than keeping the two communicating services closer to each other, i.e., reducing the hop count between each other depending on the bandwidth consumption due to their communication.

In one example, this disclosure describes a method comprising: receiving, at an edge services controller for a network interface card (NIC) fabric comprising NICs coupled by communication links in the NIC fabric, a list of services to be placed at the NICs of the NIC fabric; determining an initial distribution of service instances of the services to be placed at the NICs considering at least service central processing unit (CPU) utilization of the NICs and service data processing unit (DPU) utilization of the NICs; and distributing the service instances to the NICs of the NIC fabric according to the initial distribution.

In another example, this disclosure describes an edge services controller comprising: a memory; and a processor implemented in circuitry and configured to: receive a list of services to be placed at the NICs of the NIC fabric; determine an initial distribution of service instances of the services to be placed at the NICs considering at least service central processing unit (CPU) utilization of the NICs and service data processing unit (DPU) utilization of the NICs; and distribute the service instances to the NICs of the NIC fabric according to the initial distribution.

In another example, this disclosure describes a system comprising: a network interface card (NIC) fabric comprising NICs coupled by communication links in a NIC fabric; and an edge services controller configured to: receive a list of services to be placed at the NICs of the NIC fabric; determine an initial distribution of service instances of the services to be placed at the NICs considering at least service central processing unit (CPU) utilization of the NICs and service data processing unit (DPU) utilization of the NICs; and distribute the service instances to the NICs of the NIC fabric according to the initial distribution.

The details of one or more embodiments of this disclosure are set forth in the accompanying drawings and the description below. Other features, objects, and advantages will be apparent from the description and drawings, and from the claims.

BRIEF DESCRIPTION OF DRAWINGS

Like reference characters denote like elements throughout the description and figures.

DETAILED DESCRIPTION

Figure 1:
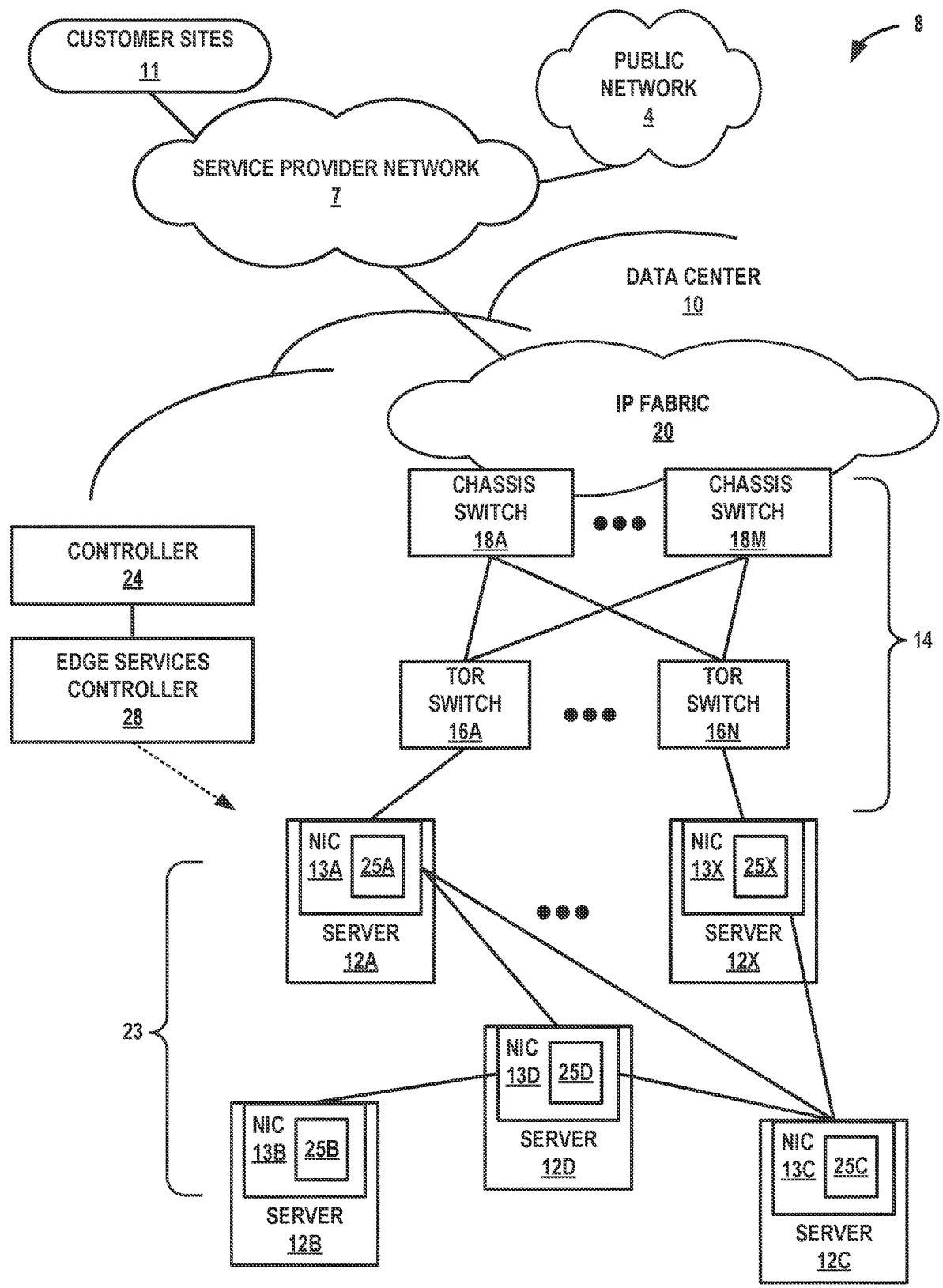
FIG. 1 is a block diagram illustrating an example network system having a data center in which examples of the techniques described herein may be implemented.

FIG. 1 is a block diagram illustrating an example network system 8 having a data center 10 in which examples of the techniques described herein may be implemented. In general, data center 10 provides an operating environment for applications and services for customer sites 11 having one or more customer networks coupled to data center 10 by a service provider network 7. Data center 10 may, for example, host infrastructure equipment, such as networking and storage systems, redundant power supplies, and environmental controls. Service provider network 7 is coupled to a public network 4. Public network 4 may represent one or more networks administered by other providers and may thus form part of a large-scale public network infrastructure, e.g., the Internet. For instance, public network 4 may represent a local area network (LAN), a wide area network (WAN), the Internet, a virtual LAN (VLAN), an enterprise LAN, a layer 3 virtual private network (VPN), an Internet Protocol (IP) intranet operated by the service provider that operates service provider network 7, an enterprise IP network, or some combination thereof.

Although customer sites 11 and public network 4 are illustrated and described primarily as edge networks of service provider network 7, in some examples, one or more of customer sites 11 and public network 4 are tenant networks within data center 10 or another data center. For example, data center 10 may host multiple tenants (customers) each associated with one or more virtual private networks (VPNs). Each of the VPNs may implement one of customer sites 11.

Service provider network 7 offers packet-based connectivity to attached customer sites 11, data center 10, and public network 4. Service provider network 7 may represent a network that is operated (and potentially owned) by a service provider to interconnect a plurality of networks. Service provider network 7 may implement Multi-Protocol Label Switching (MPLS) forwarding and, in such instances, may be referred to as an MPLS network or MPLS backbone. In some instances, service provider network 7 represents a plurality of interconnected autonomous systems, such as the Internet, which offers services from one or more service providers.

In some examples, data center 10 may represent one of many geographically distributed network data centers. As illustrated in the example of FIG. 1, data center 10 may be a facility that provides network services for customers. A customer of the service provider may be a collective entity such as an enterprise and a government, or may be an individual. For example, a network data center may host web services for several enterprises and end users. Other exemplary services may include data storage, virtual private networks, traffic engineering, file service, data mining, scientific- or super-computing, and so on. Although illustrated as a separate edge network of service provider network 7, elements of data center 10 such as one or more physical network functions (PNFs) or virtualized network functions (VNFs) may be included within a core of service provider network 7.

In this example, data center 10 includes storage and/or compute servers interconnected via switch fabric 14 provided by one or more tiers of physical network switches and routers, with servers 12A-12X (herein, "servers 12") depicted as coupled to top-of-rack (TOR) switches 16A-16N. This disclosure may refer to TOR switches 16A-16N collectively, as "TOR switches 16." TOR switches 16 may be network devices that provide layer 2 (MAC) and/or layer 3 (e.g., IP) routing and/or switching functionality.

Servers 12 may also be referred to herein as "hosts" or "host devices." Data center 10 may include many additional servers coupled to other TOR switches 16 of data center 10. In the example of FIG. 1, servers 12A and 12X are directly coupled to TOR switches 16, and servers 13B, 13C, and 13D are not directly coupled to TOR switches 16 in the illustrated example. Servers 13B, 13C, and 13D may reach TOR switches 16 and IP fabric 20 via servers 12A or 12X, as described in further detail below.

Switch fabric 14 in the illustrated example includes interconnected TOR switches 16 (or other "leaf" switches) coupled to a distribution layer of chassis switches 18A-18M (collectively, "chassis switches 18"). Chassis switches may also be referred to as "spine" or "core" switches. Although not shown in the example of FIG. 1, data center 10 may also include one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, and/or other network devices.

In some examples, TOR switches 16 and chassis switches 18 provide servers 12 with redundant (e.g., multi-homed) connectivity to IP fabric 20 and service provider network 7. Chassis switches 18 aggregate traffic flows and provide connectivity between TOR switches 16. TOR switches 16 and chassis switches 18 may each include one or more processors and a memory and may execute one or more software processes. Chassis switches 18 are coupled to IP fabric 20, which may perform layer 3 routing to route network traffic between data center 10 and customer sites 11 via service provider network 7. The switching architecture of data center 10 shown in FIG. 1 is merely an example. Other switching architectures may have more or fewer switching layers, for instance. TOR switches 16 and chassis switches 18 may each include physical network interfaces.

Although FIG. 1 shows TOR switches 16 as discussed below NICs 13 may eliminate the need for TOR switches in small datacenters by intelligently connecting the NICs to each other. In this switching architecture discussed below, services at the NICs are interconnected through ports at NICs 13.

Each of servers 12 may be a compute node, an application server, a storage server, or other type of server. For example, each of servers 12 may represent a computing device, such as an x86 processor-based server, configured to operate according to techniques described herein. Servers 12 may provide Network Function Virtualization Infrastructure (NFVI) for a Network Function Virtualization (NFV) architecture.

Servers 12 may host endpoints for one or more virtual networks that operate over the physical network represented in FIG. 1 by IP fabric 20 and switch fabric 14. Endpoints may include, e.g., virtual machines, containerized applications, or applications executing natively on the operating system or bare metal. Although described primarily with respect to a data center-based switching network, other physical networks, such as service provider network 7, may underlay the one or more virtual networks.

Each of servers 12 includes at least one network interface card (NIC) of NICs 13A-13X (collectively, "NICs 13"). For example, server 12A includes NIC 13A. Each of NICs 13 includes at least one port. Each of NICs 13 may send and receive packets over one or more communication links coupled to the ports of the NIC.

In some examples, each of NICs 13 provides one or more virtual hardware components for virtualized input/output (I/O). A virtual hardware component for virtualized I/O may be a virtualization of a physical NIC 13 (the "physical function"). For example, in Single Root I/O Virtualization (SR-IOV), which is described in the Peripheral Component Interface Special Interest Group SR-IOV specification, the Peripheral Component Interface (PCI) express (PCIe) Physical Function of the network interface card (or "network adapter") is virtualized to present one or more virtual network interface cards as "virtual functions" for use by respective endpoints executing on server 12. In this way, the virtual network endpoints may share the same PCIe physical hardware resources and the virtual functions are examples of virtual hardware components. As another example, one or more servers 12 may implement Virtio, a para-virtualization framework available, e.g., for the Linux Operating System, that provides emulated NIC functionality as a type of virtual hardware component. As another example, one or more servers 12 may implement Open vSwitch to perform distributed virtual multilayer switching between one or more virtual NICs (vNICs) for hosted virtual machines, where such vNICs may also represent a type of virtual hardware component. In some instances, the virtual hardware components are virtual I/O (e.g., NIC) components. In some instances, the virtual hardware components are SR-IOV virtual functions and may provide SR-IOV with Data Plane Development Kit (DPDK)-based direct process user space access.

In some examples, including the example of FIG. 1, one or more of NICs 13 include multiple ports. NICs 13 may be connected to one another via ports of NICs 13 and communications links to form a NIC fabric 23 having a NIC fabric topology. NIC fabric 23 is the collection of NICs 13 connected to at least one other of NICs 13 and the communications links coupling NICs 13 to one another.

NICs 13A-13X include corresponding processing units 25A-25X (collectively, "processing units 25"). Processing units 25 may offload aspects of the datapath from CPUs of servers 12. One or more of processing units 25 may be a multi-core ARM processor with hardware acceleration provided by a Data Processing Unit (DPU), a Field Programmable Gate Array (FPGA), and/or an Application Specific Integrated Circuit (ASIC). Because NICs 13 include processing units 25, NICs 13 may be referred to as "SmartNICs" or "GeniusNICs."

Edge services controller 28 may use processing units 25 of NICs 13 to augment the processing and networking functionality of switch fabric 14 and/or servers 12 that include NICs 13. In the example of FIG. 1, network system 8 includes an edge services controller 28.

Edge services control 28 may manage the operations of edge services controller 28 within NICs 13 in part by orchestrating services performed by processing units 25; orchestrating API driven deployment of services on NICs 13; orchestrating NIC 13 addition, deletion and replacement within edge services controller 28; monitoring of services and other resources on NICs 13; and/or management of connectivity between various services 133 running on NICs 13. Edge services controller 28 may include one or more computing devices, such as server devices, personal computers, intermediate network devices, or the like.

Edge services controller 28 may communicate information describing services available on NICs 13, a topology of NIC fabric 23, or other information about edge services controller 28 to an orchestration system (not shown) or a controller 24. Example orchestration systems include OpenStack, vCenter by VMWARE, or System Center by Microsoft Corporation of Redmond, Washington. Example controllers include a controller for Contrail by JUNIPER NETWORKS or Tungsten Fabric. Controller 24 may be a network fabric manager. As discussed below, edge services controller 28 may implement orchestration of services at NICs 13.

In some examples, edge services controller 28 programs processing units 25 of NICs 13 to route data packets along data paths through NIC fabric 23, e.g., based on applications (services) associated with the data packets. Routing data packets along data paths through NIC fabric 23 may avoid overloading individual NICs in NIC fabric 23 when multiple services on a pair of hosts are communicating with each other. Edge services control 28 may manage data packet routing in NIC fabric 23. As shown in FIG. 1, NIC fabric 23 comprises a plurality of NICs 13 coupled by communication links in a NIC fabric topology. In this example, edge services controller 28 may receive resource availability values from NICs 13. Edge services controller 28 may determine a data path for data packets of a flow transported using a protocol from a source NIC to a destination NIC via a NIC set that comprises at least one NIC. NICs 13 include the source NIC, the destination NIC, and the NIC set. As part of determining the data path, edge services controller 28 may select the NIC set based on the resource availability values. Edge services controller 28 may transmit to the source NIC and to each NIC in the NIC set data path data to cause the source NIC and each NIC in the NIC set to identify the data packets of the flow using an identifier of the protocol and to transmit the data packets of the flow from the source NIC to the destination NIC via the data path. Edge services controller 28 may establish multiple data paths in this manner. Unlike in a conventional data center fabric, servers 12 may thus exchange packets directly, rather than via a separate switching device (such as chassis switches 18). The above may be considered a form of service load balancing.

In a related example, one or more of NICs 13 may transmit a resource availability value of the NIC to edge services controller 28. The NIC may receive from edge services controller 28 data path data associated with a data path for data packets of a flow transported using a protocol from a source NIC in NIC fabric 23 to a destination NIC in NIC fabric 23. The data path may be computed using the resource availability value of the NIC. The data path data may comprise a flow identifier of the flow mapped to a next-hop port identifier of the NIC port. The NIC may receive a data packet of the flow and map, based on the data path data, the data packet to the flow identifier of the flow. The NIC may then output, based on the data path data and the flow identifier of the flow, the data packet via the NIC port.

In some examples, edge services controller 28 computes, based on a physical topology of physical links that connect NICs 13, a virtual topology comprising a strict subset of the physical links. Edge services controller 28 may program the virtual topology into the respective processing units of the NICs to cause the processing units of the NICs to send data packets via physical links in the strict subset of the physical links. In this way, edge services controller 28 may dynamically generate a virtual topology that provides data paths between NICs, without necessarily traversing a TOR switch. This may reduce latency between services (applications) that communicate within a rack.

In some examples, edge services controller 28 programs a processing unit of a NIC of a plurality of network interface cards 13 to receive, at a first network interface of the NIC, a data packet from a physical device. Edge services controller 28 may also program the processing unit of the NIC to modify, based on the data packet being received at the first network interface, the data packet to generate a modified data packet. Edge services controller 28 may also program the processing unit of the NIC to output the modified data packet to the physical device via a second network interface of the NIC. Programming the processing unit of the NIC in this way may enable offloading of the packet modification process from a TOR switch (e.g., one or more of TOR switches 16) or host computer to the NIC. Offloading modifications of data packets to NICs may relieve computations burdens on the TOR switch or host computer, or may extend the functionality of the TOR switch or host computer.

NICs 13 may have processing units such as CPUs and data processing units (DPUs) that may require NICs 13 to run an Operating System (OS), such as the Linux OS, to manage its resources. Datacenter administrator tools are typically unaware of the existence of the OS at NICs 13. Edge services controller 28 may create a common software platform across multiple NIC vendors by supporting features such as:

Orchestration of NICs 13 application program interface (API) driven deployment of services on NICs 13

NIC addition, deletion, and replacement.

Monitoring of services and other resources on NICs 13

Management of connectivity between various services running on the NICs 13

In a datacenter including hosts with NICs 13, edge services controller 28 may provide an API-based service deployment platform. Edge services platform users may make an API call with the service name and its associated service-level agreements (SLAs) for the service deployed on one or more NICs. The following data structure example shows some of the SLA parameters.

```
SLA {
    CPU_resources,
    network_bandwidth,
    latency,
    hardware_acceleration_resources,
    green_factor,
    number_of_instances
}
```

Edge services controller 28 may use these SLA requirements to automatically deploy the service in NIC fabric 23. Once the services are loaded onto NICs 13 at NIC fabric 23, the edge services controller 28 may migrate some of the services from one NIC to another to accommodate new requests. This disclosure focuses on four primary SLAs, CPU utilization (CPU), network bandwidth requirements (NW), hardware acceleration requirements/capabilities (DPU) and green factor (renewable energy use), however other SLAs may be used. Further, not all the resources on NICs 13 are available to be used by service instances as there may be external traffic that also consumes resources on NIC 13.

A typical rack in a datacenter includes up to 32 servers, which are connected to each other and to the external world using two Top of the Rack (TOR) switches, thus the network to server ratio is 1:16. However, customers use this model even in small deployments with fewer than 8 servers, which results in a ratio of 1:4 thus increasing the cost of the deployment.

NICs often support four or more ports, which means some of the ports may be used to connect to other servers. Edge services controller 28 may eliminate the need for TOR switches 16 in small data centers by intelligently connecting NICs 13 to each other.

Edge services controller 28 may use a service scheduling algorithm that negates the need for TOR switches 16 and deploys services on NICs 13 while also incrementally scheduling services. Edge services controller 28 may also migrate services from NIC 13 using Orchestrator Agents. The Orchestrator Agents may be located at edge services controller 28, NICs 13, or another location.

Initially, edge services controller 28 may have a queue of services to be deployed in NIC fabric 23. Edge services controller 28 may assign service instances to specific nodes depending on the available resources of these nodes. Available resources may include CPU compute, DPU compute, node bandwidth, etc. Edge services controller 28 may also take into consideration the distance between the service instances which communicate with each other (e.g., hop count between nodes if two communicating service instances are placed on separate nodes) and the weight of communication between the service instances. Service instances that communicate with each other may consume bandwidth along each hop. Thus, placing these communicating service instances further apart from each other may be detrimental. Reducing the hop count between the communicating service instances may reduce bandwidth consumption attributable to communication between the communicating service instances. Edge services controller 28 may implement an objective function so as to minimize bandwidth consumption due to all of the service communications depending on other resource constraints.

Edge services controller 28 may receive a list of services to be placed at NICs 13 of NIC fabric 23. The list of services may include service IDs as well as the number of service instances for each service to be placed into NIC fabric 23.

Edge services controller 28 may determine an initial distribution of the services instances of the services to be placed at the NICs considering at least service central processing unit (CPU) utilization of the NICs and service data processing unit (DPU) utilization of the NICs. The initial distribution may ensure that the service instances have sufficient access to resources such as the DPU utilization and CPU utilization at nodes. The initial distribution may also ensure that the service instances have sufficient access to additional resources such as bandwidth utilization and energy utilization.

Edge services controller 28 may distribute the service instances to NICs 13 of NIC fabric 23 according to the initial distribution. For example, edge services controller 28 may use orchestration agents to load the service instances onto NICs 13 of the nodes.

Edge services controller 28 may determine the initial distribution of service instances based on a plurality of candidate distributions satisfying a set of one or more constraints. Examples of initial constraints are described below with respect to FIG. 7. The initial constraints may relate to the utilization of resources by the service instances considering the placement of the service instances at NICs 13 in NIC fabric 23. Candidate distributions may be a proposed arrangement of the service instances at different NICs. The initial constraints may limit the total number of possible arrangements of service instances at the NICs. The initial constraints may relate to one or more features of the system such as DPU constraints, CPU constraints, and bandwidth constraints. For example, a CPU constraint may prevent too many service instances from being located at the same NIC considering the CPU demands of the service instances; a DPU constraint may prevent too many service instances from being located at the same NIC considering the DPU demands of the service instances, a bandwidth constraint may prevent service instances being placed at nodes such that the bandwidth between some nodes is greater than a maximum value. Such constraints may limit the candidate distributions to be scored as discussed below.

Edge services controller 28 may evaluate an objective function to determine scores for the candidate distributions based on one or more attributes of the candidate distributions. Attributes may include features of the candidate distributions including locations of service instances at NICs, hop separation of nodes or NICs containing the service instances, DPU utilization of service instances, CPU utilization of service instances, bandwidth utilization of service instances and green energy utilization of service instances. For example, the attributes may include bandwidth weights of connections between service instances of the candidate distribution and a number of connection hops between the nodes of the candidate distribution.

The objective function may be a summation of multiplications of the bandwidth weight for each pair of service instances by the number of connection hops that separate the pair of service instances in the candidate distributions. The selected initial distribution may have a lowest score among the candidate distributions. For example, the score may roughly correspond to the expected bandwidth used communicating between nodes by the service instances in the candidate distribution and minimizing the score means that the initial distribution minimizes expected bandwidth used communicating between nodes by the service instances.

If the first set of initial constraints cannot be satisfied, edge services controller 28 may do a fallback initial distribution. For example, it is possible that not all of the service instances may be placed in the NICs under the initial constraints. In that case, edge services controller 28 may place service instances in a fallback distribution to maximize the service instances placed in the NIC under fallback constraints. Edge services controller 28 may, based on a second plurality of candidate distributions satisfying a second fallback set of one or more constraints, evaluate an additional fallback objective function to determine scores for the second plurality of candidate distributions based on a number of the service instances placed at the NICs. Edge services controller 28 may select the initial distribution as the candidate distribution with the highest number of service instances placed at the NICs.

Figure 8:
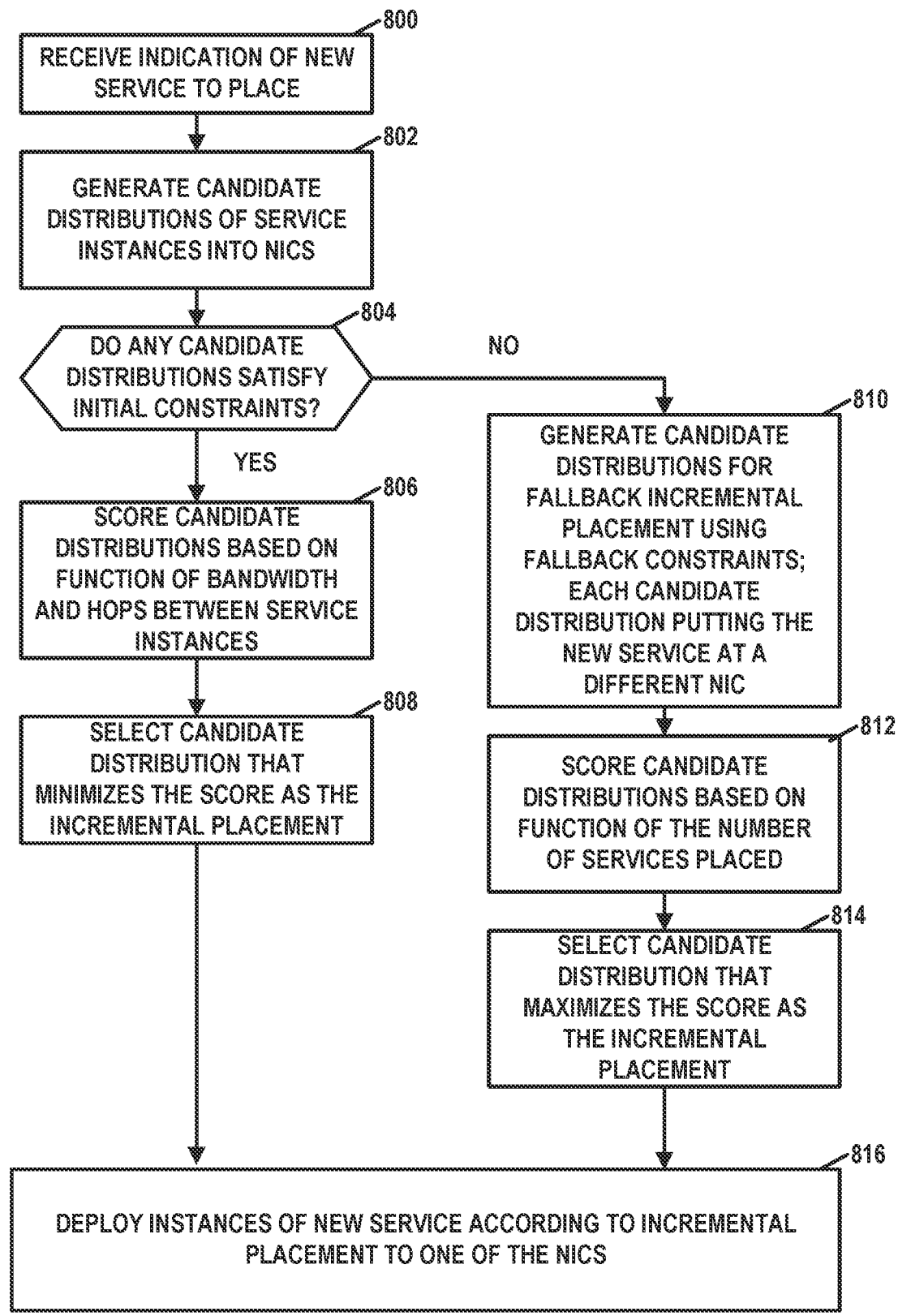
FIG. 8 is a flowchart illustrating an incremental placement of a service at NICs by an edge services controller according to techniques of this disclosure.

Edge services controller 28 may also do incremental distributions of the service instances for new service instances. Edge services controller 28 may receive an indication of an additional service instances. Edge services controller 28 may determine an incremental distribution for the additional service. Edge services controller 28 may distribute the additional service to at least one of NICs 13 of NIC fabric 23 according to the incremental distribution. FIG. 8 discussed below describe details of an exemplary incremental distribution.

Edge services controller 28 may use a further plurality of candidate distributions satisfying a further set of one or more constraints. The further plurality of candidate distributions assigning the additional service to one of the NICS. Edge services controller 28 may evaluate an objective function to determine the scores for the further plurality of candidate distributions based on one or more attributes of the candidate distributions. For each of the further plurality of candidate distributions, the attributes of the candidate distributions of the further plurality of candidate distributions may include bandwidth weights of connections between pairs of service instances and a number of connection hops between the pairs of service instances; wherein the incremental distribution has a lowest score among the further plurality of candidate distributions. If the further incremental set of one or more constraints cannot be satisfied by any candidate distribution and based on one or more candidate distributions satisfying a second further fallback incremental set of one or more constraints selecting one of the one or more candidate distributions as the incremental distribution.

As discussed with respect to FIG. 9 below, edge services controller 28 may determine a rebalanced distribution for the service instances. For example, bandwidth weights between service instances may change over time and thus a preferred distribution of the service instances may also change. Edge services controller 28 may redistribute the service instances to NICs 13 of NIC fabric 23 according to the rebalanced distribution. Edge services controller 28 may determine at least one pinned service at a specific NIC. Redistributing the service instances may keep the at least one pinned service at the specific NIC.

Edge services controller 28 may, before redistributing the service instances to NICs 13 of NIC fabric 23 according to the rebalanced distribution, determine that an improvement of the rebalanced distribution is above an objective threshold (such that the rebalance distribution is worth the disruption involved) and determine that utilization of NIC fabric 23 is below a utilization threshold (such that NIC fabric 23 has the capacity to be updated without excessively disrupting operation of NIC fabric 23).

The described service placement method for service instances in NICs 13 of NIC fabric 23 has a number of technical advantages. The described service placement method for service instances in NICs 13 of NIC fabric 23 may be done such that the bandwidth of inter service communications in NIC fabric 23 is reduced. This allows for increased performance of NIC fabric 23 with bandwidth constraints. The reduction in the bandwidth of inter service communications in NIC fabric 23 also may be such that it makes feasible the use of NICs 13 in NIC fabric 23 that does not use TOR switches thus reducing the total cost of a datacenter. Removing TOR switches may result in NIC fabric 23 where service instances at NICs 13 of NIC fabric 23 are separated by multiple hops which may multiply inter service bandwidth consumption. The described service placement method for service instances in NICs 13 of NIC fabric 23 may assign the service instances so that such an increase in inter service bandwidth consumption is kept within acceptable levels.

Figure 2:
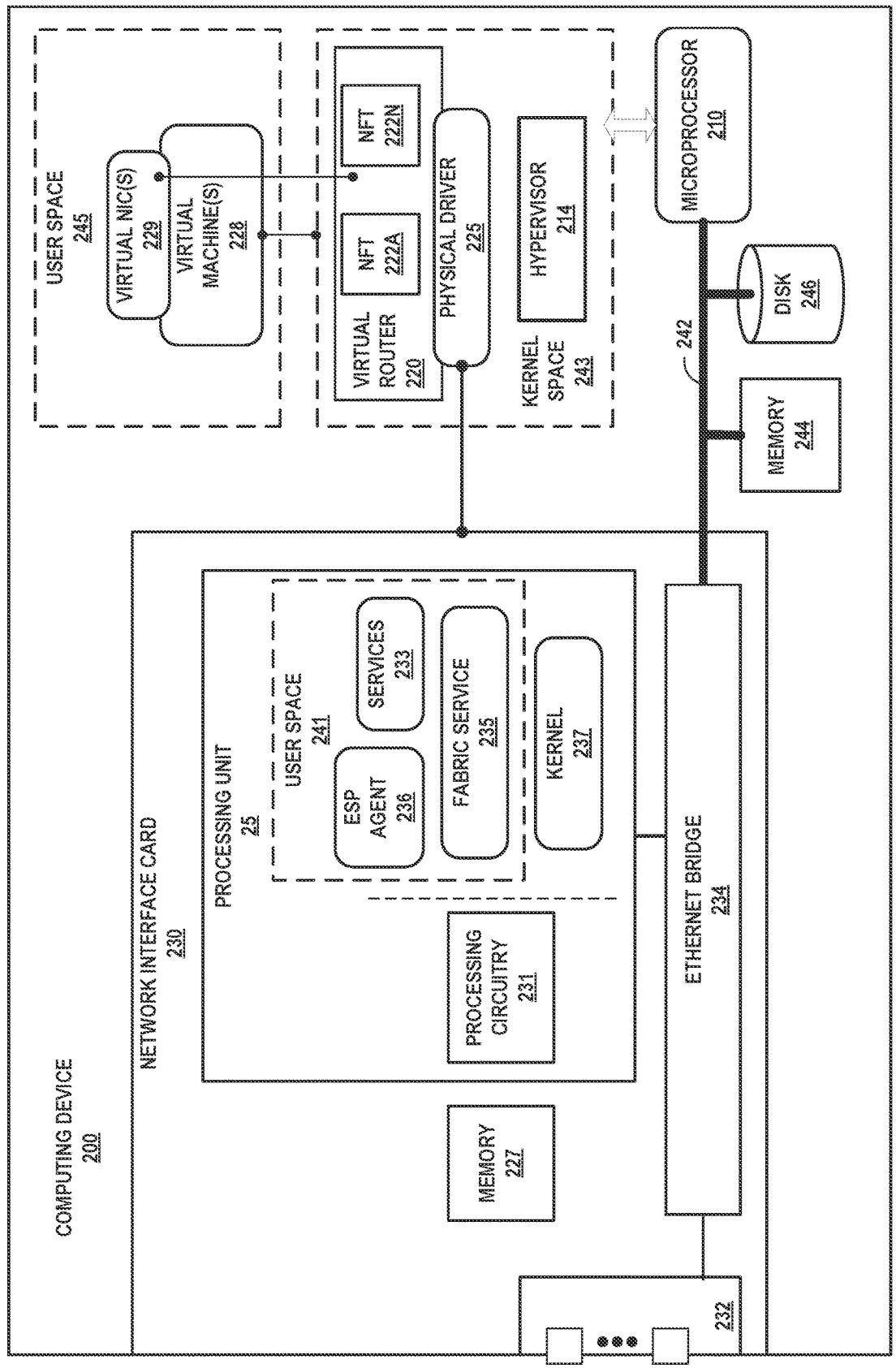
FIG. 2 is a block diagram illustrating an example computing device that uses a network interface card, to perform services managed by an edge services controller according to techniques described herein.

FIG. 2 is a block diagram illustrating an example computing device 200 that uses a NIC 230 to perform services managed by edge services controller 28 according to techniques described herein. NIC 230 may have a separate processing unit 25. Computing device 200 of FIG. 2 may represent a real or virtual server and may represent an example instance of any of servers 12 of FIG. 1. In the example of FIG. 2, computing device 200 includes a bus 242 that couples hardware components of the hardware environment of computing device 200.

Specifically, in the example of FIG. 2, bus 242 couples a Single Route Input/Output Virtualization (SR-IOV)-capable NIC 230, a storage disk 246, and a microprocessor 210. In some examples, a front-side bus couples microprocessor 210 and memory device 244. In some examples, bus 242 couples memory device 244, microprocessor 210, and NIC 230. Bus 242 may represent a PCIe bus. In some examples, a direct memory access (DMA) controller may control DMA transfers among components coupled to bus 242. In some examples, components coupled to bus 242 control DMA transfers among components coupled to bus 242.

Microprocessor 210 may include one or more processors, each including an independent execution unit ("processing core") to perform instructions that conform to an instruction set architecture. Execution units may be implemented as separate integrated circuits (ICs) or may be combined within one or more multi-core processors (or "many-core" processors) that are each implemented using a single IC (i.e., a chip multiprocessor).

Disk 246 represents one or more computer readable storage media that include volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that may be used to store the desired information and that may be accessed by microprocessor 210.

Memory device 244 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that may be used to carry or store desired program code and program data in the form of instructions or data structures and that can be accessed by a computer. Memory device 244 provides a physical address space composed of addressable memory locations.

Network interface card (NIC) 230 includes one or more interfaces 232 configured to exchange packets using links of an underlying physical network. Interfaces 232 may include a port interface card having one or more network ports. NIC 230 also include an on-card memory 227 to, e.g., store packet data. Direct memory access transfers between NIC 230 and other devices coupled to bus 242 may read/write from/to memory 227.

Memory device 244, NIC 230, disk 246, and microprocessor 210 provide an operating environment for a software stack that executes a hypervisor 214 and one or more virtual machines 228 managed by hypervisor 214. In general, a virtual machine provides a virtualized/guest operating system for executing applications in an isolated virtual environment. Because a virtual machine is virtualized from physical hardware of the host server, executing applications are isolated from both the hardware of the host and other virtual machines. Computing device 200 executes hypervisor 214 to manage virtual machines 228. Example hypervisors include Kernel-based Virtual Machine (KVM) for the Linux kernel, Xen, ESXi available from VMWARE, Windows Hyper-V available from MICROSOFT, and other open-source and proprietary hypervisors. Hypervisor 214 may represent a virtual machine manager (VMM). Virtual machines 228 may host one or more applications, such as virtual network function instances. In some examples, a virtual machine 228 may host one or more VNF instances, where each of the VNF instances is configured to apply a network function to packets.

An alternative to virtual machines is the virtualized container, such as those provided by the open-source DOCKER Container application. Like a virtual machine, each container is virtualized and may remain isolated from the host machine and other containers. However, unlike a virtual machine, each container may omit an individual operating system and provide only an application suite and application-specific libraries. A container is executed by the host machine as an isolated user-space instance and may share an operating system and common libraries with other containers executing on the host machine. Thus, containers may require less processing power, storage, and network resources than virtual machines. As used herein, containers may also be referred to as virtualization engines, virtual private servers, silos, or jails. In some instances, the techniques described herein with respect to containers and virtual machines or other virtualization components.

While virtual network endpoints in FIG. 2 are illustrated and described with respect to virtual machines, other operating environments, such as containers (e.g., a DOCKER container) may implement virtual network endpoints. An operating system kernel (not shown in FIG. 2) may execute in kernel space and may include, for example, a Linux, Berkeley Software Distribution (BSD), another Unix-variant kernel, or a Windows server operating system kernel, available from MICROSOFT.

Hypervisor 214 includes a physical driver 225 to use a physical function provided by NIC 230. In some cases, NIC 230 may also implement SR-IOV to enable sharing the physical network function (I/O) among virtual machines 224. Each port of NIC 230 may be associated with a different physical function. The shared virtual devices, also known as virtual functions, provide dedicated resources such that each of virtual machines 228 (and corresponding guest operating systems) may access dedicated resources of NIC 230, which therefore appears to each of virtual machines 224 as a dedicated NIC. Virtual functions may be lightweight PCIe functions that share physical resources with the physical function and with other virtual functions. NIC 230 may have thousands of available virtual functions according to the SR-IOV standard, but for I/O-intensive applications the number of configured virtual functions is typically much smaller.

Virtual machines 228 include respective virtual NICs 229 presented directly into the virtual machine 228 guest operating system, thereby offering direct communication between NIC 230 and virtual machines 228 via bus 242, using the virtual function assigned for the virtual machine. This may reduce hypervisor 214 overhead involved with software-based VIRTIO and/or vSwitch implementations in which a memory address space of hypervisor 214 within memory device 244 stores packet data and because copying packet data from NIC 230 to the memory address space of hypervisor 214 and from the memory address space of hypervisor 214 to memory address spaces of virtual machines 228 consumes cycles of microprocessor 210.

NIC 230 may further include a hardware-based Ethernet bridge 234. Ethernet bridge 234 may be an example of an embedded switch 234. Ethernet bridge 234 may perform layer 2 forwarding between virtual functions and physical functions of NIC 230. Thus, in some cases, Ethernet bridge 234 provides hardware acceleration, via bus 242, of inter-virtual machine 224 packet forwarding and hardware acceleration of packet forwarding between hypervisor 214 and any of virtual machines 224. Hypervisor 214 may access the physical function via physical driver 225. Ethernet bridge 234 may be physically separate from processing unit 25.

Computing device 200 may be coupled to a physical network switch fabric that includes an overlay network that extends a switch fabric from physical switches to software or "virtual" routers of physical servers coupled to the switch fabric, including virtual router 220. Virtual routers may be processes or threads, or a component thereof, executed by the physical servers, e.g., servers 12 of FIG. 1, that dynamically create and manage one or more virtual networks usable for communication between virtual network endpoints. In one example, virtual routers implement each virtual network using an overlay network, which provides the capability to decouple an endpoint's virtual address from a physical address (e.g., IP address) of the server on which the endpoint is executing. Each virtual network may use its own addressing and security scheme and may be viewed as orthogonal from the physical network and its addressing scheme. Various techniques may be used to transport packets within and across virtual networks over the physical network. At least some functions of the virtual router may be performed as one of services 233 or fabric service 235. In the example of FIG. 2, virtual router 220 executes within hypervisor 214 that uses physical function 221 for I/O, but virtual router 220 may execute within a hypervisor, a host operating system, a host application, one of virtual machines 228, and/or processing unit 25 of NIC 230.

In general, each virtual machine 228 may be assigned a virtual address for use within a corresponding virtual network, where each of the virtual networks may be associated with a different virtual subnet provided by virtual router 220. A virtual machine 228 may be assigned its own virtual layer three (L3) IP address, for example, for sending and receiving communications but may be unaware of an IP address of the computing device 200 on which the virtual machine is executing. In this way, a "virtual address" is an address for an application that differs from the logical address for the underlying, physical computer system, e.g., computing device 200.

In one implementation, computing device 200 includes a virtual network (VN) agent (not shown) that controls the overlay of virtual networks for computing device 200 and that coordinates the routing of data packets within computing device 200. In general, a VN agent communicates with a virtual network controller for the multiple virtual networks, which generates commands to control routing of packets. A VN agent may operate as a proxy for control plane messages between virtual machines 228 and virtual network controller, such as controller 24 (FIG. 1). For example, a virtual machine may request to send a message using its virtual address via the VN agent, and the VN agent may in turn send the message and request that a response to the message be received for the virtual address of the virtual machine that originated the first message. In some cases, a virtual machine 228 may invoke a procedure or function call presented by an application programming interface of the VN agent, and the VN agent may handle encapsulation of the message as well, including addressing.

In one example, network packets, e.g., layer three (L3) IP packets or layer two (L2) Ethernet packets generated or consumed by the instances of applications executed by virtual machine 228 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed by virtual router 220. This functionality is referred to herein as tunneling and may be used to create one or more overlay networks. Besides IPinIP, other example tunneling protocols that may be used include IP over Generic Route Encapsulation (GRE), Virtual Extensible Local Area Network (VXLAN), Multiprotocol Label Switching (MPLS) over GRE (MPLSoGRE), MPLS over User Datagram Protocol (UDP) (MPLSoUDP), etc.

As noted above, a virtual network controller may provide a logically centralized controller for facilitating operation of one or more virtual networks. The virtual network controller may, for example, maintain a routing information base, e.g., one or more routing tables that store routing information for the physical network as well as one or more overlay networks. Virtual router 220 of hypervisor 214 implements a network forwarding table (NFT) 222A-222N for N virtual networks for which virtual router 220 operates as a tunnel endpoint. In general, each NFT 222 stores forwarding information for the corresponding virtual network and identifies where data packets are to be forwarded and whether the packets are to be encapsulated in a tunneling protocol, such as with a tunnel header that may include one or more headers for different layers of the virtual network protocol stack. Each of NFTs 222 may be an NFT for a different routing instance (not shown) implemented by virtual router 220.

Edge services controller 28 (FIG. 1) may use processing unit 25 of NIC 230 to augment the processing and networking functionality of computing device 200. Processing unit 25 includes processing circuitry 231 to execute services orchestrated by edge services controller 28. Processing circuitry 231 may represent any combination of processing cores, ASICS, FPGAs, or other integrated circuits and programmable hardware. In an example, processing circuitry may include a System-on-Chip (SoC) having, e.g., one or more cores, a network interface for high-speed packet processing, one or more acceleration engines for specialized functions (e.g., security/cryptography, machine learning, storage), programmable logic, integrated circuits, and so forth. Such SoCs may be referred to as data processing units (DPUs). DPUs may be examples of processing unit 25.

In the example NIC 230, processing unit 25 executes an operating system kernel 237 and a user space 241 for services. Kernel 237 may be a Linux kernel, a Unix or BSD kernel, a real-time OS kernel, or other kernel for managing hardware resources of processing unit 25 and managing user space 241.

Services 233 may include network, security, storage, data processing, co-processing, machine learning or other services. Services 233, edge services platform (ESP) agent 236, and fabric service 235 include executable instructions. Processing unit 25 may execute instructions of services 233, ESP agent 236, and fabric service 235 as processes and/or within virtual execution elements such as containers or virtual machines. As described elsewhere in this disclosure, services 233 may augment the processing power of the host processors (e.g., microprocessor 210), e.g., by enabling computing device 200 to offload packet processing, security, or other operations that would otherwise be executed by the host processors. Network services of services 233 may include security services (e.g., firewall), policy enforcement, proxy, load balancing, or other L4-L7 services.

Processing unit 25 executes ESP agent 236 to exchange data with edge services controller 28 (FIG. 1) for an edge services platform. While shown in the example of FIG. 2 as being in user space 241, in other examples, ESP agent 236 is a kernel module of kernel 237. As an example, ESP agent 236 may collect and send telemetry data to an ESP controller. The telemetry data may be generated by services 233 and may describe traffic in the network, availability of computing device 200 or network resources, resource availability of resources of processing unit 25 (such as memory or core utilization), or other information. As another example, ESP agent 236 may receive, from the ESP controller, service code to execute any of services 233, service configuration to configure any of services 233, packets or other data for injection into the network.

Edge services controller 28 manages the operations of processing unit 25 by, e.g., orchestrating and configuring services 233 that are executed by processing unit 25, deploying services 233; adding, deleting and replacing NICs within NIC fabric 23, monitoring of services 233 and other resources on NIC 230, and managing connectivity between various services 233 running on NIC 230. Example resources on NIC 230 include memory 227 and processing circuitry 231.

Processing circuitry 231 may execute fabric service 235 to perform packet switching among NIC 230 and one or more other NICs that are directly connected to NIC 230 ports, i.e., not via an external switch such as TOR switches 16. Edge services controller 28 may provide topology information to fabric service 235 via ESP agent 236, the topology information describing a topology of NIC fabric 23. Edge services controller 28 may provide flow information and/or forwarding information to fabric service 235 via ESP agent 236. The flow information describes, and is usable for identifying, packet flows. The forwarding information is usable for mapping packets received by NIC 230 to an output port of NIC 230. In some cases, fabric service 235 may independently compute forwarding information and/or flow information.

Fabric service 235 may determine processing and forwarding of packets received at NIC 230 and bridged by Ethernet bridge 234 to processing unit 25. A packet received by NIC 230 may have been sent to NIC 230 from a NIC of another computing device or may have originated from user space 245 of computing device 200. Like other services 233 of NIC 230, fabric service 235 may process a received packet. Based on information received from edge services controller 28 or generated by fabric service 235, such as forwarding information and/or flow information, fabric service 235 may map the received packet to an output port that is directly coupled, via a communicate link, to another NIC in NIC fabric 23.

In some examples, ESP agent 236 may cause NIC 230 to transmit a resource availability value of NIC 230 to edge services controller 28. NIC 230 may receive from edge services controller 28, data path data associated with a data path for data packets of a flow transported using a protocol from a source NIC in NIC fabric 23 to a destination NIC in NIC fabric 23. The data path may be computed, in part, using the resource availability value of NIC 230. The data path data may comprise a flow identifier of the flow mapped to a next-hop port identifier of a NIC port (e.g., one of interfaces 232). NIC 230 may receive a data packet of the flow and fabric service 235 may map, based on the data path data, the data packet to the flow identifier of the flow. NIC 230 may then output, based on the data path data and the flow identifier of the flow, the data packet via the NIC port.

In some examples, edge services controller 28 computes, based on a physical topology of physical links that connect NICs, such as NIC 230, a virtual topology comprising a strict subset of the physical links. Edge services controller 28 may program the virtual topology into the respective processing units of the NICs (e.g., processing unit 25 of NIC 230) to cause the processing units of the NICs to send data packets via physical links in the strict subset of the physical links. In this way, edge services controller 28 may dynamically generate a virtual topology that provides data paths between NICs, without necessarily traversing a TOR switch. This may reduce latency between services (applications) that communicate within a rack.

In some examples, edge services controller 28 programs processing unit 25 of NIC 230 of a plurality of NICs 13 to receive, at a first network interface of NIC 230, a data packet from a physical device. Edge services controller 28 may also program processing unit 25 of NIC 230 to modify, based on the data packet being received at the first network interface, the data packet to generate a modified data packet. Edge services controller 28 may also program processing unit 25 of NIC 230 to output the modified data packet to the physical device via a second network interface of the NIC. Programming processing unit 25 of NIC 230 in this way may enable offloading of the packet modification process from a TOR switch (e.g., one or more of TOR switches 16) or host computer to the NIC. Offloading modifications of data packets to NICs 13 may relieve computational burdens on the TOR switch or host computer, or may extend the functionality of the TOR switch or host computer.

Figure 3:
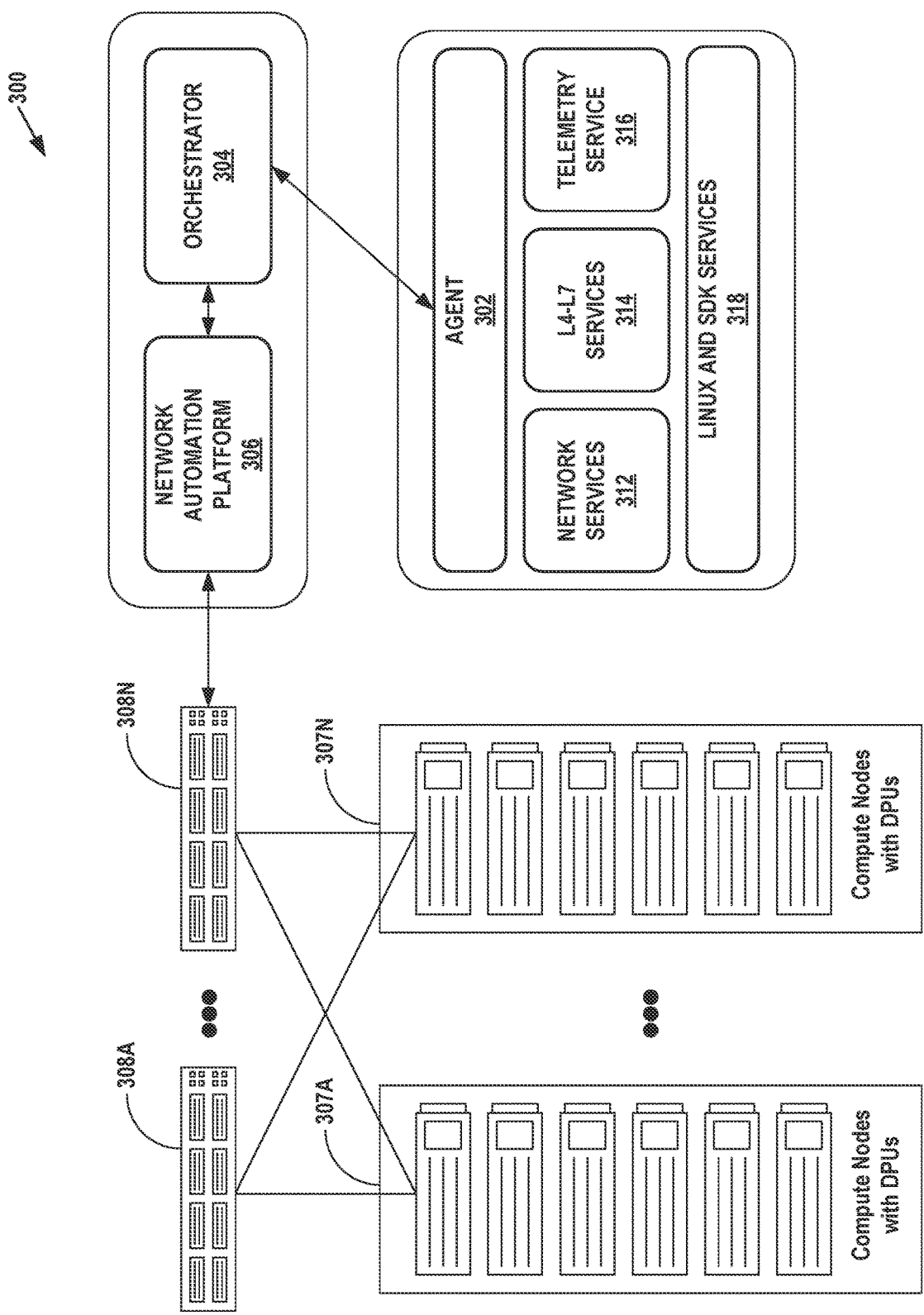
FIG. 3 is a conceptual diagram illustrating a data center with servers that each include a network interface card controlled by an edge services controller, according to techniques of this disclosure.

FIG. 3 is a conceptual diagram illustrating a data center 300 with servers that each include a network interface card controlled by an edge services controller, according to techniques of this disclosure. The network interface card may have a separate processing unit. Racks of compute nodes 307A-307N (collectively, "racks of compute nodes 307") may correspond to servers 12 of FIG. 1, and switches 308A-308N (collectively, "switches 308") may correspond to the switches of switch fabric 14 of FIG. 1. An agent 302 or orchestrator 304 represents software executed by the processing unit (illustrated in FIG. 3 as a data processing unit or DPU) and receives configuration information for the processing unit and sends telemetry and other information for the NIC that includes the processing unit to orchestrator 304. Network services 312, L4-L7 services 314, telemetry service 316, and Linux and software development kit (SDK) services 318 may represent examples of services 233. Orchestrator 304 may represent an example of edge services controller 28 of FIG. 1.

Network automation platform 306 connects to and manages network devices and orchestrator 304, by which network automation platform 306 can utilize the edge services controller. Network automation platform 306 may, for example, deploy network device configurations, manage the network, extract telemetry, and analyze and provide indications of the network status.

Figure 4:
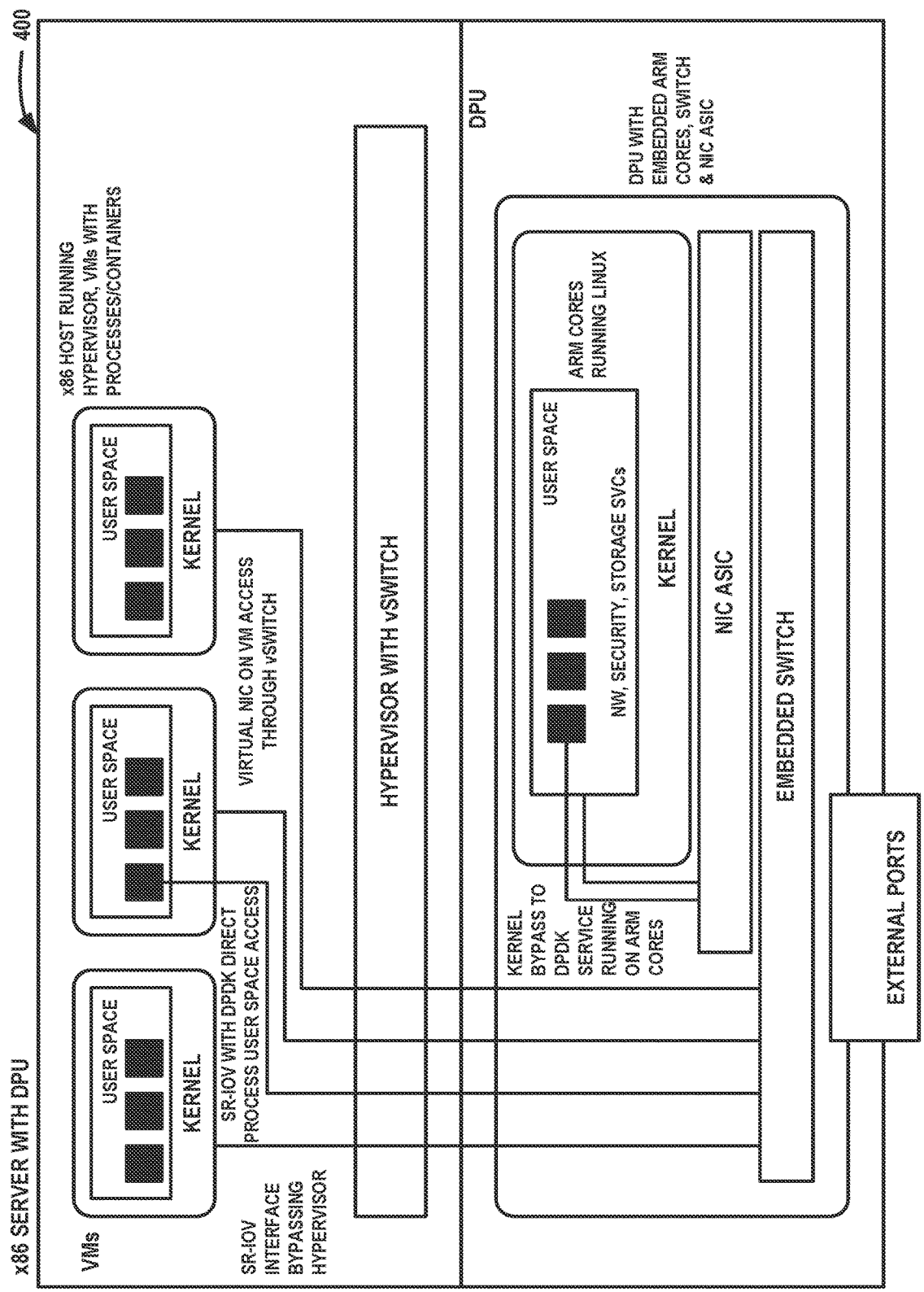
FIG. 4 is a block diagram illustrating an example computing device that uses a network interface card to perform services managed by an edge services controller according to techniques of this disclosure.

FIG. 4 is a block diagram illustrating an example computing device that uses a network interface card to perform services managed by edge services controller 28 according to techniques described herein. The network interface card may have a separate processing unit. Although virtual machines are shown in this example, other instances of computing device 400 may also or alternatively run containers, native processes, or other endpoints for packet flows. Different types of vSwitches may be used, such as Open vSwitch or a virtual router (e.g., Contrail). Other types of interfaces between endpoints and NIC are also contemplated, such as tap interfaces, veth pair interfaces, etc.

Figure 5:
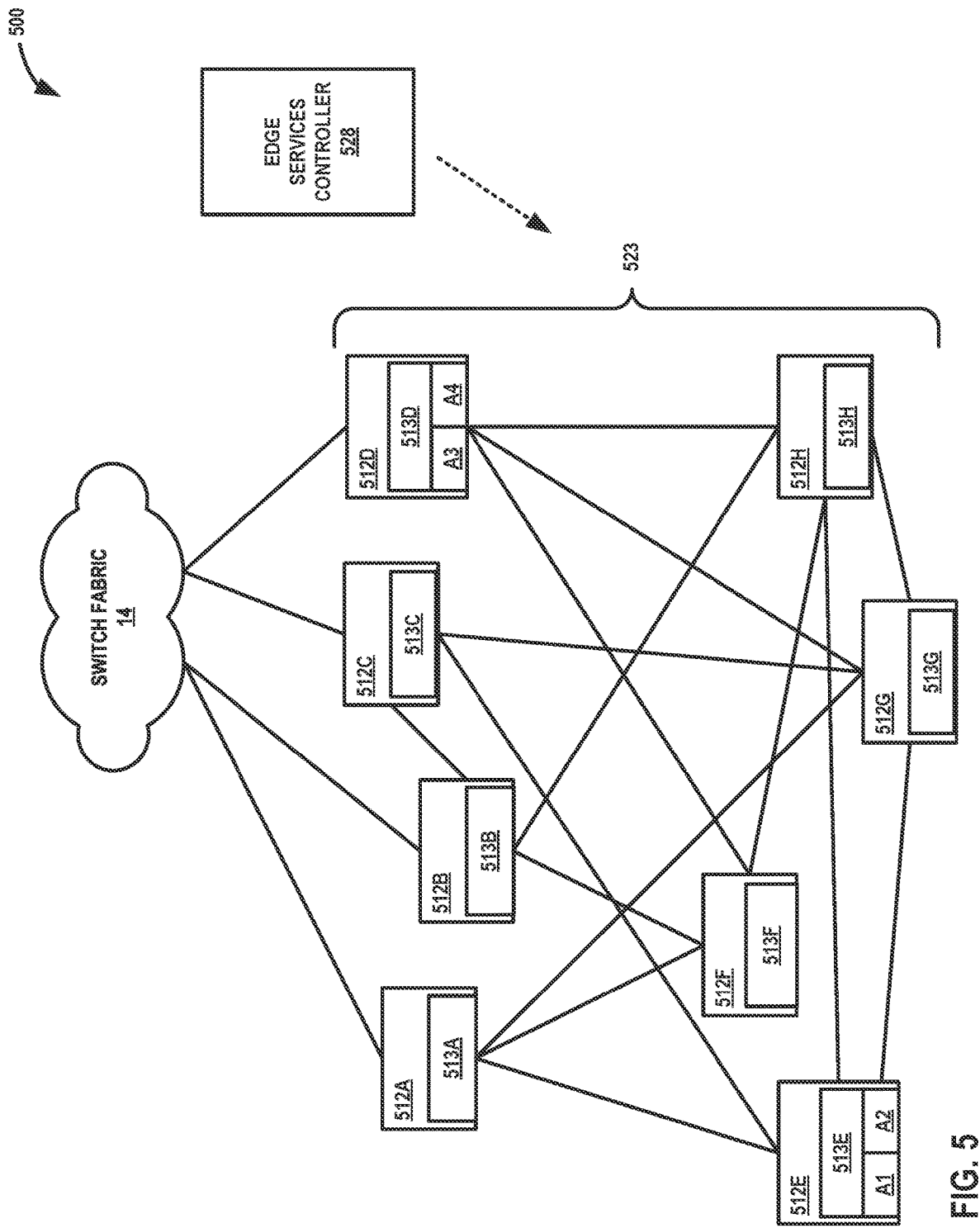
FIG. 5 is a block diagram illustrating an example system, according to techniques of this disclosure.

FIG. 5 is a block diagram illustrating an example system 500, according to techniques of this disclosure. System 500 includes a plurality of servers 512A-512H (collectively, "servers 512") communicatively coupled via a NIC fabric 523 and a switch fabric 514. System 500 includes an edge services controller 528. Each of the plurality of servers 512A-512H may include a corresponding one of NICs 513A-513H (collectively, "NICs 513"). NIC fabric 523 includes NICs 513. NIC fabric 523 may include a plurality of potential data paths between pairs of NICs 513 that do not traverse switches of switch fabric 514. Each of these "data paths" is a path through NIC fabric 523 from a source NIC to a destination NIC, and this term is distinct from datapath processing. Edge services controller 528 may be communicatively coupled to each of NICs 513 in NIC fabric 523. NIC fabric 523 is communicatively coupled to switch fabric 514. Switch fabric 514 may include one or more switches.

Each of servers 512 may have a configuration similar to the configuration of computing device 200. Each of NICs 513 may have a configuration similar to the configuration of NIC 230. Edge services controller 528 may be similar to edge services controller 28. While eight servers 512 and eight NICs 513 are shown in the example system 500 of FIG. 5, alternative examples of systems may include a fewer or a greater number of servers 512 and NICs 513. While each server is shown as including a single NIC, alternative examples of the system may include servers with more than one NIC.

Servers 512 may execute one or more applications. In an example, the one or more applications may be server applications hosted by servers 512 and may represent endpoints, as described with respect to FIG. 1. In an example, the one or more applications may be NIC applications executed by processing units of NICs 513. The implementation of data paths between two different NICs at two different servers may involve two stages. The first stage may be an orchestration stage and the second stage may be a forwarding stage. Edge services controller 528 may define or orchestrate one or more data paths between the two different NICs at two different servers during the orchestration stage. Edge services controller 528 may provide data path data associated with the orchestrated data paths to NICs in the data paths. NICs in the orchestrated data paths may forward data packets in accordance with the orchestrated data paths during the forwarding stage. Data path data may be an example of forwarding information described with respect to FIG. 1.

The implementation of the orchestration stage and the forwarding stage will be described with reference to applications A1, A2 running on server 512E and applications A3, A4 running on server 512D. Applications A1, A2, A3, and A4 may be server applications (i.e., applications executed by the host processors) or may be NIC applications (i.e., applications executed by a processing unit on the NIC). In this example, application A1 and application A3 may be services of a service chain, and application A2 and application A4 may be services of a service chain.

Application A1 may be configured to generate application data for transport in data packets, and server 512E may be configured to send the data packets in accordance with a first protocol for transmission to application A3. Application A1 may be referred to as a first source application A1 and the application A3 may be referred to as a first destination application. Application A2 may be configured to generate application data for transport in data packets, and server 512E may be configured to send the data packets in accordance with a second protocol for transmission to application A4. Application A2 may be referred to as a second source application A2 and application A4 may be referred to as a second destination application. The second protocol may be different from the first protocol.

Examples of the first and second protocols include, but are not limited to, transport layer protocols or tunneling protocols (which may leverage transport layer protocols). The first protocol may for example be a VXLAN protocol. The second protocol may be for example, a Multiprotocol Label Switching/User Datagram Protocol (MPLSoUDP) protocol. While the example is described with reference to VXLAN and MPLSoUDP protocols, other protocols may be used. Server 512E, which includes source applications A1 and A2, may be referred to as a source server 512E. NIC 513E at source server 512E may be referred to as a source NIC 513E. Server 512D includes destination applications A3 and A4, and may be referred to as a destination server 512D. NIC 513D at destination server 512D may be referred to as a destination NIC 513D.

NICs 513 in NIC fabric 523 and edge services controller 528 may implement NIC-based data packet forwarding. In this environment, processing units 25 in NICs 513 may be shared by services running on associated servers 512 and NIC fabric 523. If all traffic between a set of two of servers 512 takes the same data path all the time, the traffic between the servers may overload NIC 513 and impact the services running on servers 512. For example, if traffic from application A1 to application A3 and traffic from application A2 to application A4 was forwarded on the same data path from source NIC 513E to destination NIC 513D, this may result in relatively high utilization of resources of any NICs 513 along that data path and adversely affect performance.

Edge services controller 528 may address this problem by implementing "service aware" or "application-based" routing of the data packets. Edge services controller 528 may orchestrate the application-based data path and one or more of NICs 51 forward data packets in accordance with the orchestrated application-based data path for a pair of applications executing on servers 512 or NICs 513.

When an application (or service) is deployed at one of servers 512 or at one of NICs 513, edge services controller 528 may be provided with data regarding the deployed application during the configuration of the deployed application. Examples of such data may include a protocol associated with the deployed application and the other applications that the deployed application may communicate with. Furthermore, when an application is deployed to a host (e.g., one of servers 512), edge services controller 528 may configure the application's preferred transport in NIC fabric 523. For example, if a first service (S1) and a third service (S3) use VXLAN to communicate with each other, and a second service (S2) and a fourth service (S4) use MPLSoUDP for communication, edge services controller 528 may configure NIC fabric 523 to ensure that each application's transport requirements are met. For example, edge services controller 528 may specify, e.g., in a flow table, outer header encapsulation for packets sent between services. The services may be running on top of a host OS or executed by processing units of NICs 513, or both. In some examples, edge services controller 528 may deploy the applications or devices to servers 512 using the techniques described elsewhere in this disclosure, e.g., based on local SLAs and external SLAs of NICs 513.

In an example where NIC 513E is a source NIC and NIC 513D is a destination NIC, NIC fabric 523 may include a number of different data paths between source NIC 513E and destination NIC 513D. Application of services 233 to packets may utilize compute and bandwidth resources at each of NICs in NIC fabric 523. In many cases, application of services 233 to packets may utilize a percentage of the total available computing resources at some of NICs 513 and the remaining percentage of computing resources may be available to implement data packet forwarding functions (e.g., fabric service 235). Each of NICs 513 in NIC fabric 523 may provide resource availability values that indicates available computing resources at that NIC 513 to edge services controller 528. Example types of resource availability values may include values indicating CPU utilization, network utilization, and so on. Edge services controller 528 may identify, based on the resource availability values, NICs 513 in NIC fabric 523 that are suitable to implement data packet forwarding functions. For example, edge services controller 528 may compare the resource availability values received from each of NICs 513 to a resource availability threshold value, or to compare resource availability of NICs 513 to one another, to identify NICs 513 in NIC fabric 523 that are suitable to implement data packet forwarding functions. Suitable NICs 513 may include NICs 513 that have sufficient computing resources in processing units 25 to apply a fabric service to an expected amount of traffic for the pair of application communicating, a threshold amount of computing resources, or other criteria. Edge services controller 528 may use the identified NICs to orchestrate data paths between NICs in NIC fabric 523. When edge services controller 528 orchestrates a data path between a pair of NICs in NIC fabric 523, edge services controller 528 may provide data path data to NICs logically located along that data path to cause the NICs to forward data packets in accordance with the orchestrated data path. In some examples, edge services controller 528 may use one or more of the processes described elsewhere in this disclosure to determine a virtual topology having the data paths.

Figure 6:
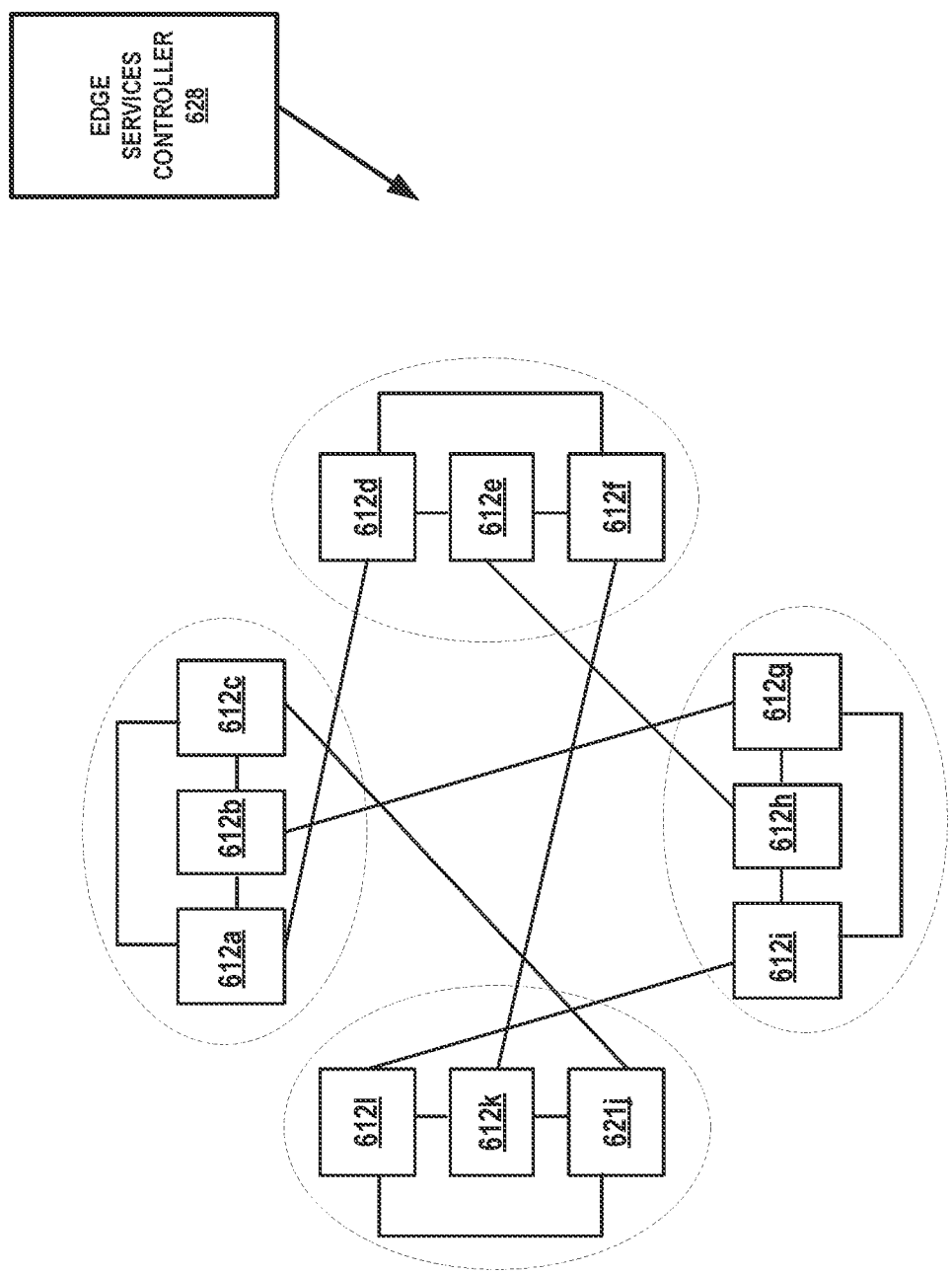
FIG. 6 is a diagram of an exemplary topology of nodes interconnected with NICs according to techniques of this disclosure.

FIG. 6 is a diagram of an exemplary topology of nodes interconnected with NICs in a NIC fabric according to techniques of this disclosure. In an example service scheduling problem, there are several nodes with NICs. Edge services controller 28 may deploy services onto the NICs so that the services may use the computational capabilities of NICs. The example fabric topology of FIG. 6 shows a fixed data center network topology i.e., DCell with 12 nodes 612a-6121 with NICs. Dcell is a server-centric hybrid data center network architecture. In traditional Dcell networks, each mini cluster is fully connected using a TOR switch.

In the example of FIG. 6, the multiple ports present in each NIC may be used to interconnect the NIC fabric without a TOR switch. In the example fabric topology of FIG. 6, the network diameter is 3. Each node 612a-6121 may reach every other node with a maximum of 3 hops. For example, node 612a may reach node 612h using a first hop to node 612b, a second hop to node 612g and then a third hop to node 612h. Other topologies may also use techniques of this disclosure as well.

As described below with respect to FIGS. 7 and 8, edge services controller 628 may assign the services to NICs at nodes 612a-6121 to keep the bandwidth used by service communications relatively low. In some examples, the number of hops between services at NICs may affect the total communication bandwidth use. Two services at node 612a will not require any internode communication bandwidth; a service at node 612a and a service at node 612b may use one hop worth of internode communication bandwidth; a service at node 612a and a service at node 612g may use two hops worth of internode communication bandwidth (roughly twice the one hop worth of internode communication bandwidth); and a service at node 612a and a service at node 612h may use three hops worth of internode communication bandwidth (roughly three times one hop worth of internode communication bandwidth). Thus, edge services controller 628 may attempt to keep services with substantial amounts of interservice communication relatively close in terms of the hops.

Figure 7:
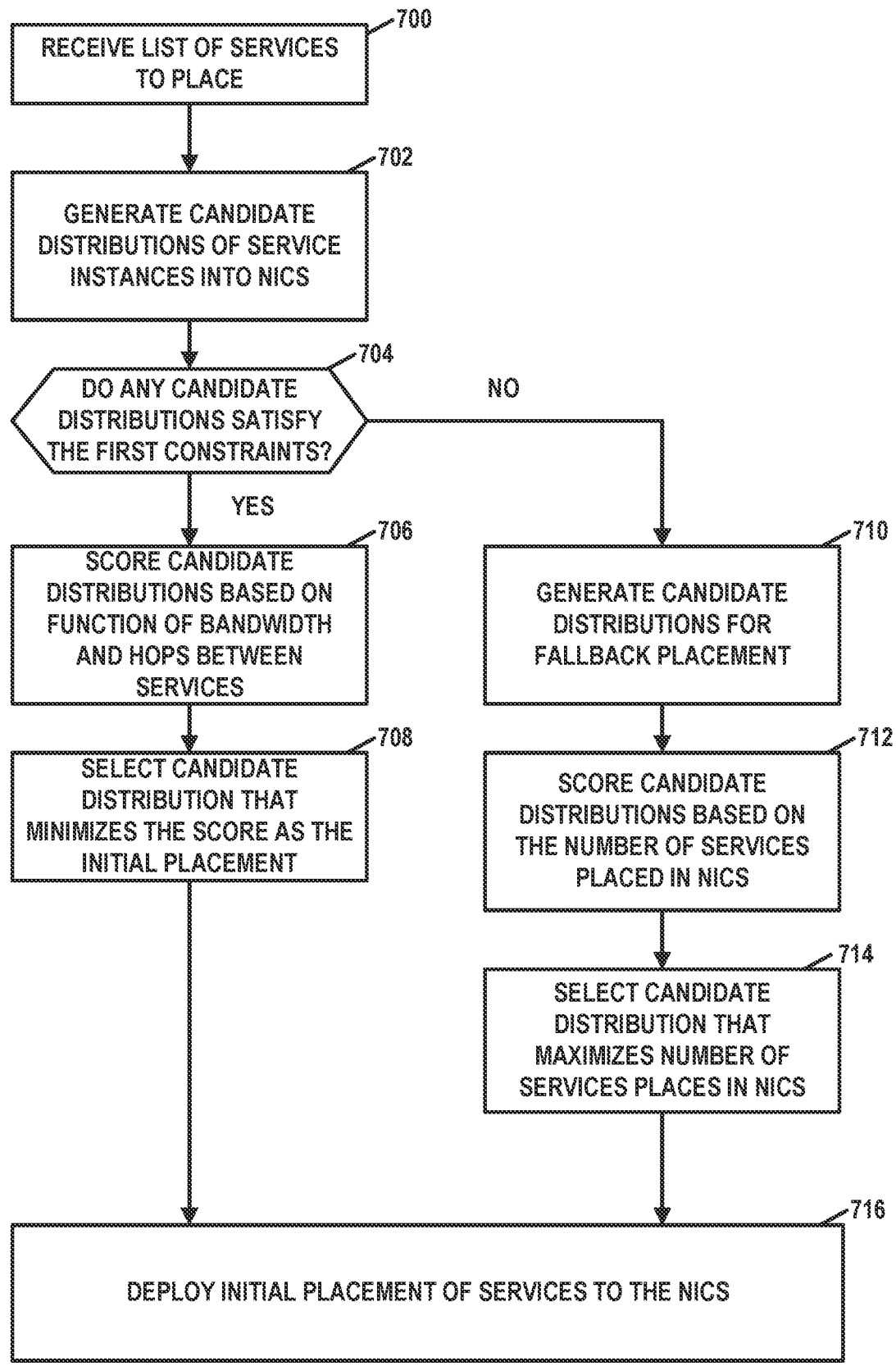
FIG. 7 is a flowchart illustrating an initial placement of services at NICs by an edge services controller according to techniques of this disclosure.

FIG. 7 is a flowchart illustrating an initial placement of services at NICs by an edge services controller according to techniques of this disclosure. Edge services controller 28 may receive a list of services to place in NICs of a NIC fabric (700). The list of services may include service IDs and a number of service instances for that service to be placed at NICs 13 of NIC fabric 23.

Edge services controller 28 may generate candidate distributions of the service instances into NICs 13 of the NIC fabric 23 (702). The candidate distributions may be a set of possible placements of the service instances at NICs 13 of NIC fabric 23. Edge services controller 28 may check candidate distributions to see if any of the candidate distributions satisfy the constraints. A candidate distribution satisfies a constraint if the placement of service instances of the candidate distribution is such that the constraint is met. Edge services controller 28 may evaluate the candidate distributions against a first set of constraints and then scored using an objective function. Edge services controller 28 may determine if any candidate distributions satisfy the first constraints (704). If any of the candidate distributions satisfy the first constraints ("YES" branch of 704), edge services controller 28 may score the candidate distributions that satisfy the first constraints based on a function of the bandwidth and hops between service instances (706). Edge services controller 28 may select the candidate distribution that minimizes this score as the initial placement of the service instances in NICs 13 of NIC fabric 23 (708). Edge services controller 28 may deploy the initial placement of service instances to NICs 13 of NIC fabric 23 (716).

An example objective function is described below. W is a n×n weight matrix that indicates communication between service instances. Matrix values $w_{ik}$ in W may indicate the bandwidth of communication from a service i to a service k. A simplified weight matrix may have matrix values $w_{ik}$ as a 1 if the services i and k communicate and as a 0 if the services i and k do not communicate. Using 1 and 0 to indicate in W whether service instances communicate may to simplify W. Further, a matrix H may include matrix values that indicate the number hops between two nodes hosting two services.

Inputs to the objective function may include one or more of the following:

A→Set of services
N→Set of nodes
$H_{jn}$→Number of hops between nodes j and n
$W_{ik}$→Weight of communication between services i and k
$D_j$→Available DPU resource on node j
$C_j$→Available CPU resource on node j
$B_j$→Available bandwidth on node j
$d_i$→Required DPU resource by service i
$c_i$→Required CPU resource by service i
$b_i$→Required bandwidth by service i
$d'_n$→Required DPU usage for a link with node n and another node.
$c'_n$→Required CPU usage for a link with node n and another node.
$b'_n$→Required bandwidth usage for a link with node n and another node.
$I_i$→Number of instances of service i that need to be deployed
$E_j$→Energy utilization on node j
$e_i$→Energy utilization by service i
$e'_n$→ is the required usage for a link with node n and another node.
green→Threshold of global energy utilization
G→Binary variable to determine if green quotient is required
$S_{ij}$→Binary variable to indicate if service i resides on node j
$x_{nj}$→Binary variable to indicate if link exists between n and j For an initial placement, edge services controller 28 may minimize the following objective function under constraints. Edge services controller 28 may use the objective function to distribute the service instances such that internode communication or bandwidth between service instances may be minimized.

Initial Placement
Objective Function:

$$\min \sum_{i \in A} \sum_{k \in A} \sum_{j \in N} \sum_{n \in N} H_{jn} W_{ik} S_{ij} S_{kn} \quad (1)$$

In this objective function:
$S_{ij}$ is 1 if service i is at node j, and 0 otherwise.
$S_{kn}$ is 1 if service k is at node n, and 0 otherwise.
$W_{ik}$ is the bandwidth weight between service i and k.
$H_{jn}$ is the number of hops between nodes j and node n (where the services i and k are located respectively)

The summation of the objective function is a summation of the bandwidth weights of each pair of service instances multiplied by the number of hops between the nodes where each pair of service instances is located. Minimizing this summation may minimize the bandwidth of the internode service communication. For example, each placement of a service instance has a calculated bandwidth weight to every other service instance multiplied by the hops to each other service instance. Edge services controller 28 may calculate the objective function for each candidate distribution that satisfies the below constraints to find the candidate with the lowest score for the objective function to find the candidate distribution that minimizes the bandwidth of the internode service communication.

Example constraints are described below. The constraints limit the evaluated candidate distributions to feasible placements that do not violate any of the constraints. Edge services controller 28 may check each candidate distribution to see whether the candidate distribution satisfies each of the below constraints before scoring the candidate distribution. The constraints effectively correspond to potential restrictions on the placement of service instances in viable candidate distributions.

Constraints:

$$D_j \geq \sum_{i \in A} d_i S_{ij} + \sum_{n \in N} x_{nj} d'_n \quad (2)$$

For all j in N

Equation (2) is a DPU constraint. The set of services is denoted by A, while the set of nodes is denoted by N. $d_i S_{ij}$ is the DPU usage of service i if service i resides at node j. If service i does not reside at node j, $d_i S_{ij}$ is 0. Thus, $\Sigma_{i \in A} d_i S_{ij}$ is the total DPU requirements of service instances hosted by node j and may be considered as the service DPU utilization of the NIC.

d'n is the required DPU usage for a link between node n and another node. d'n indicates the DPU resource used to process (such as by forwarding) the network packets received from neighbor nodes/NICs.

$x_{nj}$d'n is the DPU usage of a link between node n and node j if node j has a link to node n, and 0 otherwise. Therefore, $\Sigma_{n \in N} x_{nj} d'_n$ is the total DPU usage at node j due to links to other nodes.

$D_j$ indicates the available DPU capacity at node j. The DPU constraint assures that, for each node j, the DPU usage is not greater than the DPU capacity at node j (i.e., the DPU usage is not greater than $D_j$).

$$C_j \geq \sum_{i \in A} c_i S_{ij} + \sum_{n \in N} x_{nj} c'_n \quad (3)$$

For all j in N

Equation (3) is a CPU constraint. The set of services is denoted by A, while the set of nodes is denoted by N. $c_i S_{ij}$ is the CPU usage of service i if service i resides at node j. If service i does not reside at node j, $c_i S_{ij}$ is 0. Thus, $\Sigma_{i \in A} c_i S_{ij}$ is the total CPU requirements of service instances hosted by node j and may be considered as the service CPU utilization of the NIC.

c'n is the required DPU usage for a link between node n and another node. c'n indicates the CPU resource used to process (such as by forwarding) the network packets received from neighbor nodes/NICs. $x_{nj}c'_n$ is the CPU usage of a link between node n and node j if node j has a link to node n, and 0 otherwise. Therefore, $\Sigma_{n \in N} x_{nj} c'_n$ is the total CPU usage at node j due to links to other nodes.

Cj indicates the available CPU capacity at node j. The CPU constraint assures that, for each node j, the CPU usage is not greater than the CPU capacity at node j (i.e., the CPU usage is not greater than Cj).

$$B_j \geq \sum_{i \in A} b_i S_{ij} + \sum_{n \in N} x_{nj} b'_n \quad (4)$$

For all j in N

Equation (4) is a Bandwidth constraint. The set of services is denoted by A, while the set of nodes is denoted by N. $b_i S_{ij}$ is the CPU usage of service i if service i resides at node j. If service i does not reside at node j, $b_i S_{ij}$ is 0. Thus, $\Sigma_{i \in A} b_i S_{ij}$ is the total bandwidth requirements of service instances hosted by node j.

b'n is the required bandwidth usage for a link between node n and another node. $b'_n$ indicates the bandwidth used to transmit (such as by forwarding) the network packets received from neighbor nodes/NICs. $x_{nj} b'_n$ is the bandwidth usage of a link between node n and node j if node j has a link to node n, and 0 otherwise. Therefore, $\Sigma_{n \in N} x_{nj} b'_n$ is the total bandwidth usage at node j due to links to other nodes. (e.g., the bandwidth used by link overhead and the like).

Bj indicates the available bandwidth capacity at node j. The bandwidth constraint assures that, for each node j, the bandwidth usage is not greater than the bandwidth capacity at node j (i.e., the bandwidth usage is not greater than Bj).

$$\sum_{j \in N} S_{ij} = I_i \tag{5}$$

For all i in A

The constraint of equation (5) assures that each service i is placed at the nodes such that the total instances of each service i is equal to the desired number of instances for service i, $I_i$.

$$\sum_{i \in A} \sum_{j \in N} S_{ij} = \sum_{i \in A} I_i \tag{6}$$

The constraint of equation (6) also assures that each service i is placed at the nodes such that the total instances of each service i is equal to the desired number of instances, Ii.

$$E_j = \sum_{i \in A} e_i S_{ij} + \sum_{n \in N} x_{nj} e'_n \tag{7}$$

$$G \sum_{j \in N} E_j \le \text{green} \tag{8}$$

Equations (7) and (8) are energy constraints. Equation (7) determines the energy use at each node j. (i.e., $E_j$ indicates the energy use at node j). The set of services is denoted by A, while the set of nodes is denoted by N. $e_i S_{ij}$ is the energy use of service i if service i resides at node j. If service i does not reside at node j, $e_i S_{ij}$ is 0. Thus, $\Sigma_{i \in A} e_i S_{ij}$ is the total energy use of service instances hosted by node j.

e'n is the required energy use for a link between node n and another node. e'n indicates the energy used to process (such as by forwarding) the network packets received from neighbor nodes/NICs. $x_{nj} e'_n$ is the energy use of a link between node n and node j if node j has a link to node n, and 0 otherwise. Therefore, $\Sigma_{n \in N} x_{nj} e'_n$ is the total energy use at node j due to links to other nodes. (e.g., the energy used by link overhead and the like).

If the green constraint G is 0 then the energy constraint will be always met. If the green constant G is set to 1, the energy constraint (equation 8) assures that the total energy used, $\Sigma_{j \in N} E_j$, is below the value "green".

$$S_{ij} d_i < D_j \tag{9}$$

$$S_{ij} c_i < C_j \tag{10}$$

$$S_{ij} b_i < B_j \tag{11}$$

Constraints of equations (9), (10) and (11) ensure that each particular service does not exceed the DPU limit (Dj), CPU limit (Cj) and bandwidth limit (Bj).

$$S_{ij} \in \{0, 1\} \tag{12}$$

$$x_{nj} \in \{0, 1\} \tag{13}$$

Equations (12) and (13) indicate that $S_{ij}$ and $x_{nj}$ are restricted to the values 0 or 1.

If there is no feasible solution for the objective function given the constraints, edge services controller 28 may use a fallback placement that maximizes the number of service instances that can be deployed. If no candidate distribution satisfies the initial constraints ("NO" branch of 704), edge services controller 28 may generate candidate distributions for the fallback placement (710). Edge services controller 28 may score these candidate distributions based on the number of service instances placed in NICs 13 of NIC fabric 23 (712). Edge services controller 28 may select the candidate distribution that maximizes the number of service instances placed in NICs 13 of NIC fabric 23 as the initial placement. Edge services controller 28 may deploy the initial placement of service instances to NICs 13 of NIC fabric 23 (716).

The fallback initial placement may be given as:

Fallback Initial Placement

Objective Function:

$$\max \sum_{i \in A} \sum_{j \in N} S_{ij} \tag{14}$$

In the fallback objective function of equation (14):

$S_{ij}$ is 1 if service i is at node j, and 0 otherwise.

The summation of the objective function is a summation of number of service instances of services at the nodes. Edge services controller 28 may calculate the fallback objective function for each candidate distribution that satisfies the below fallback constraints to find the candidate with the highest score for the fallback objective function to find the candidate distribution that maximizes the number of service instances placed at the nodes.

Example fallback constraints are described below. The fallback constraints limit the evaluated candidate distributions to feasible placements that do not violate any of the constraints. Edge services controller 28 may check each candidate to see whether they satisfy each of the below fallback constraints before scoring the candidate distribution. The fallback constraints effectively correspond to potential restrictions on the placement of service instances in viable candidate distributions.

Constraints:

$$D_j \geq \sum_{i \in A} d_i S_{ij} + \sum_{n \in N} x_{nj} d'_n \quad (15)$$

For all j in N

The DPU constraint is the same as above.

$$C_j \geq \sum_{i \in A} c_i S_{ij} + \sum_{n \in N} x_{nj} c'_n \quad (16)$$

For all j in N

The CPU constraint is the same as above.

$$B_j \geq \sum_{i \in A} b_i S_{ij} + \sum_{n \in N} x_{nj} b'_n \quad (17)$$

For all j in N

The bandwidth constraint is the same as above.

$$E = \sum_{i \in A} e_i S_{ij} + \sum_{n \in N} x_{nj} e'_n \quad (18)$$

$$G \sum_{j \in N} E_j \leq \text{green} \quad (19)$$

The energy constraint is the same as above.

$$\sum_{j \in N} S_{ij} \leq I_i \quad (20)$$

For all i in A $$\sum_{i \in A} \sum_{j \in N} S_{ij} \leq \sum_{i \in A} I_i \quad (21)$$

The service instance constraints of equations (20) and (21) may be loosened to allow less than the desired number of service instances to be placed at NICs 13 of NIC fabric 23. For example, edge services controller 28 may apply service instance constraints of equations (20) and (21) instead of the constraint of equation (6) above. Using the service instance constraints of equations (20) and (21), the total instances of each service i may be less than the desired number of instances, $I_i$.

$$S_{ij} d_i < D_j \quad (22)$$

$$S_{ij} c_i < C_j \quad (23)$$

$$S_{ij} b_i < B_j \quad (24)$$

The constraints of equations (22), (23) and (24) ensure that each particular service does not exceed the DPU limit (Dj), CPU limit (Cj) and bandwidth limit (Bj).

$$S_{ij} \in \{0, 1\} \quad (25)$$

$$x_{nj} \in \{0, 1\} \quad (26)$$

Equations (25) and (26) indicate that $S_{ij}$ and $x_{nj}$ are restricted to the values 0 or 1.

FIG. 8 is a flowchart illustrating an incremental placement of a service at NICs 13 by edge services controller 28 according to techniques of this disclosure. After the initial placement of the service instances, NIC fabric 23 is operational. However, there may be new incoming services to be added to the NIC fabric 23 which may be queued at a queue at edge services controller 28. When there is a new incoming service in the queue at edge services controller 28, edge services controller 28 may attempt an incremental placement with a single iteration for the new service rather than iterating over all the existing services. In other words, edge services control 28 does not reevaluate the placement of instances of each of the existing services when adding a new service, but instead may evaluate only where to place instances of the new service. The incremental objective function and constraints may be otherwise similar to the initial objective function and constraints discussed above.

For instance, in the example of FIG. 8, edge services controller 28 may receive an indication of a new service to place in NICs 13 of NIC fabric 23 (800). The new service may include a service ID and a number of service instances for the new service to be placed at NICs 13 of NIC fabric 23.

Edge services controller 28 may generate candidate distributions of the service instances into NICs 13 of NIC fabric 23 (802). The candidate distributions may be a set of possible placements of instances of the new service at NICs 13 of NIC fabric 23. The candidate distributions may assign the instances of the new service at NICS 13 of NIC fabric 23 without moving instances of other services. If any of the candidate distributions satisfies the first constraints ("YES" branch of 804), edge services controller 28 may score the candidate distributions based on a function of the bandwidth and hops between service instances (806). Edge services controller 28 may select the candidate distribution that minimizes the score as the incremental placement of instances of the new service in NICs 13 of NIC fabric 23 (808). Edge services controller 28 may deploy the instances of the new service to NICs 13 of NIC fabric 23 according to the selected candidate distribution (816).

An example incremental placement is as follows:

Incremental Placement

Objective Function:

$$\min \sum_{k \in A} \sum_{j \in N} \sum_{n \in N} H_{jn} W_{ik} S_{ij} S_{kn} \quad (27)$$

For New Service i

The incremental objective function is similar to the initial objective function discussed above but the incremental objective function need not be summed over all of the services i because only one new service i is to be placed. However, interactions with all the services k are still considered. Edge services controller 28 may generate candidate distributions that satisfy the following constraints:

Constraints:

$$D_j \geq \sum_{i \in A} d_i S_{ij} + \sum_{n \in N} x_{nj} d'_n \quad (28)$$

For all j in N $$C_j \geq \sum_{i \in A} c_i S_{ij} + \sum_{n \in N} x_{nj} c'_n \quad (29)$$

For all j in N $$B_j \geq \sum_{i \in A} b_i S_{ij} + \sum_{n \in N} x_{nj} b'_n \quad (30)$$

For all j in N $$\sum_{j \in N} S_{ij} = I_i \quad (31)$$

For New Service i $$E = \sum_{i \in A} e_i S_{ij} + \sum_{n \in N} x_{nj} e'_n \quad (32)$$

$$G \sum_{j \in N} E_j \leq \text{green} \quad (33)$$

$$S_{ij} d_i < D_j \quad (34)$$

$$S_{ij} c_i < C_j \quad (35)$$

$$S_{ij} b_i < B_j \quad (36)$$

$$S_{ij} \in \{0, 1\} \quad (37)$$

$$x_{nj} \in \{0, 1\} \quad (38)$$

If edge services controller 28 is unable to deploy every instance of the service using the above incremental objective function (equation 27) and incremental constraints (equations 28-38), edge service controller 28 may use a fallback incremental placement. The fallback incremental placement may modify the incremental optimization to maximize the number of instances of the service that are deployed. The fallback incremental objective function and constraints may be similar to the fallback initial objective function and constraints discussed above. The fallback incremental objective function may maximize the number of service instances placed at nodes 13 in the case where not all of the desired service instances $I_i$ may be placed at the nodes.

If there is no feasible solution for incremental objective function (equation 27) given the constraints, edge services controller 28 may use a fallback placement that maximizes the number of services instances that are deployed. If no candidate distribution satisfies the incremental constraints ("NO" branch of 804), edge services controller 28 may generate candidate distributions for the fallback incremental placement, each candidate distribution putting the new service at a different NIC (810). Edge services controller 28 may score these candidate distributions based on the number of service instances placed in NICs of the NIC fabric 23 (812). Edge services controller 28 may select the candidate distribution that maximizes the number of service instances placed in NICs 13 of NIC fabric 23 as the incremental placement. Edge services controller 28 may deploy the incremental placement of service instances to NICs 13 of NIC fabric 23 (816).

An example fallback incremental placement function and constraints may be as follows.

Fallback Incremental Placement

Objective Function:

$$\max \sum_{j \in N} S_{ij} \quad (39)$$

The fallback incremental objective function maximizes the number instances of the new service i placed at the nodes (subject to the constraint below that the number of instances of service i does not exceed $I_i$.

Constraints:

$$D_j \geq \sum_{i \in A} d_i S_{ij} + \sum_{n \in N} x_{nj} d'_n \quad (40)$$

For all j in N $$C_j \geq \sum_{i \in A} c_i S_{ij} + \sum_{n \in N} x_{nj} c'_n \quad (41)$$

For all j in N $$B_j \geq \sum_{i \in A} b_i S_{ij} + \sum_{n \in N} x_{nj} b'_n \quad (42)$$

For all j in N $$\sum_{j \in N} S_{ij} \leq I_i \quad (43)$$

For all i in A $$E = \sum_{i \in A} e_i S_{ij} + \sum_{n \in N} x_{nj} e'_n \quad (44)$$

$$G \sum_{j \in N} E_j \leq \text{green} \quad (45)$$

$$S_{ij} d_i < D_j \quad (46)$$

$$S_{ij} c_i < C_j \quad (47)$$

$$S_{ij} b_i < B_j \quad (48)$$

$$S_{ij} \in \{0, 1\} \quad (49)$$

$$x_{nj} \in \{0, 1\} \quad (50)$$

Figure 9:
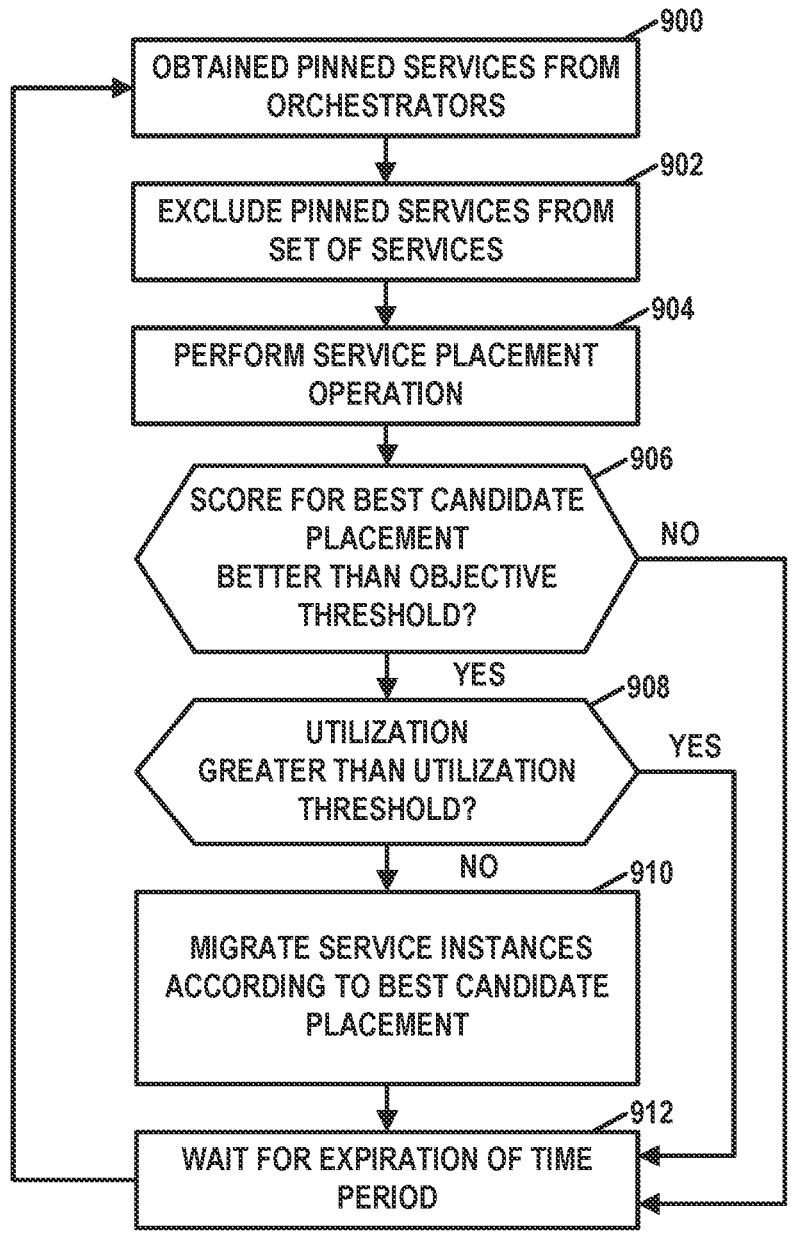
FIG. 9 is a flowchart illustrating a rebalanced placement of services at NICs by an edge services controller according to techniques of this disclosure.

FIG. 9 is a flowchart illustrating a rebalanced placement of service instances at NICs 13 by edge services controller 28 according to techniques of this disclosure. The bandwidth used by service instances may vary over time and thus the values of for the weight matrix W are not constant and may change. Hence, an initial optimized placement may not remain optimal. In this case, edge services controller 28 may rerun the evaluation and check if a new candidate placement would be significantly better than the current service instance placement.

Edge services controller 28 may obtain a list of pinned services instances from orchestrators (900). The pinned services may be service instances that would be too disruptive to move from their current NIC. Service instances that cannot or should not be moved once deployed are considered to be pinned to the nodes and their locations are not updated in a revised placement. Thus, the revised placement may just consider a subset of the services instances. Edge services controller 28 may exclude these pinned service instances from a set of service instances to be moved (902). Edge services controller 28 may perform a service placement operation (904). The service placement operation may be as described in FIG. 7 except that the pinned services are fixed at their current NICs. Fixing the pinned services at their current NICs may effectively reduce the number of candidate distributions.

In the service placement operation, edge services controller 28 may produce a best candidate distribution with an associated score. Edge services controller 28 may check if the value for the best candidate placement is better than an objective threshold (906). For example, the score for the best candidate placement may be combined in a function with the score for the current service instance placement and then compared to an objective threshold, In one case, the score from equation (1) for the best candidate placement, $S_b$, and score from equation (1) for the current service instance placement $S_c$ may be compared using a function such as:

$$S_c - S_b \geq \text{OBJ\_THRESH} \qquad (51)$$

Where OBJ_THRESH is a threshold for optimal value.

In one example, a primary objective is to find service placement with least values for number of hops and network bandwidth. When we fail to primary objective, we settle for values above the configured OBJ_THRESH as a convergence strategy. For example, if configured values of OBJ_THRESHOLD are HopCount as 3 and Bandwidth is 40 GBPS. The evaluation algorithm tries to find placement for a service with better values for hop count & bandwidth than OBJ_THRESHOLD within configured threshold time period TIME_PERIOD. If we fail to find such a service placement, we will settle for the configured threshold values.

The cost of migrating an already deployed service may be high and hence shall be carried out only when the overall utilization of all nodes does not exceed a certain threshold, such as UTL_THRESH. Edge services controller 28 may also check if utilization of NIC fabric 23 is above a utilization threshold (908). The utilization may be a function of the current DPU, CPU and/or bandwidth utilization within the NIC fabric 23 or any other indication that a service instance rebalance would be too disruptive.

If the utilization of NIC fabric 23 is high, then a redeployment is too disruptive. If utilization of NIC fabric 23 is not above the utilization threshold ("NO" branch of 908), edge services controller 28 may migrate the service instances according to the best candidate placement (910). After redeployment or a decision not to redeploy, edge services controller 28 may wait a time period, such as TIME_PERIOD, before reattempting a redeployment (912).

Figure 10:
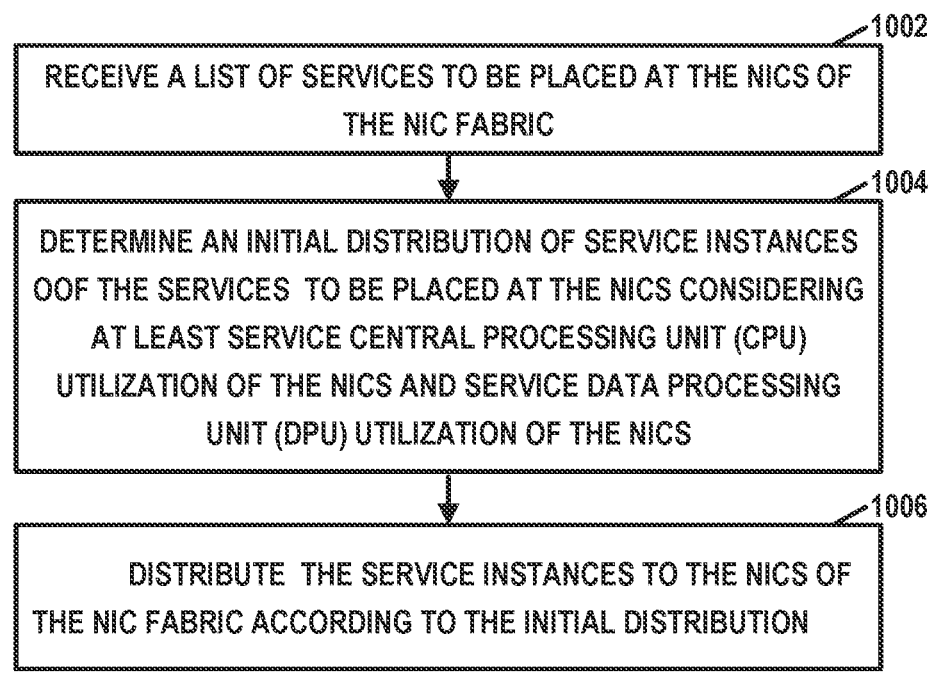
FIG. 10 is a flowchart illustrating an example method according to techniques of this disclosure.

FIG. 10 is a flowchart illustrating an example method according to techniques of this disclosure. Edge services controller 28 may receive a list of services to be placed at NICs 13 of NIC fabric 23 (1002). The service list may include service IDs an indication of the number of service instances desired to be placed in the NIC fabric for each service.

Edge services controller 28 may determine an initial distribution of the services to be placed at NICs 13 considering at least service central processing unit (CPU) utilization of the NICs and service data processing unit (DPU) utilization of the NICs (1004). The service CPU utilization of the NICs is a measure of utilization of the CPU by the service instances the NICs in the initial distribution or in candidate distributions. For example, components of the constraints of equations (3) (16) (29) and (41) include terms related to the service CPU utilization of the NICs. The service DPU utilization of the NICs is a measure of utilization of the DPU by the service instances the NICs in the initial distribution or in candidate distributions. For example, components of the constraints of equations (2) (15) (28) (40) concern service data processing unit (DPU) utilization of the NICs. Edge services controller 28 may determine the initial distribution using objective functions, such as those of equations (1), (14), (27) and (39), and constraints, such as those of equations (2)-(13), (15)-(26), (28)-(38) and (40)-(50) with respect to candidate distributions.

Edge services controller 28 may distribute the service instances to NICs 13 of NIC fabric 23 according to the initial distribution (1006). For example, edge services controller 28 may load the service instances to the NICs or instruct a service orchestrator to load the services to the NICs.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A method comprising:
   receiving, at an edge services controller for a network interface card (NIC) fabric comprising NICs coupled by communication links in the NIC fabric, a list of services to be placed at the NICs of the NIC fabric;
   determining an initial distribution of service instances of the services to be placed at the NICs considering at least service central processing unit (CPU) utilization of the NICs and service data processing unit (DPU) utilization of the NICs; and
   distributing the service instances to the NICs of the NIC fabric according to the initial distribution.

2. The method of claim 1, wherein determining the initial distribution of service instances comprises:
   based on a plurality of candidate distributions satisfying a set of one or more constraints:
      evaluating an objective function to determine scores for the candidate distributions based on one or more attributes of the candidate distributions, wherein for each of the candidate distributions:
         the attributes of the candidate distributions include bandwidth weights of connections between service instances of the candidate distribution and a number of connection hops between nodes of the candidate distribution; wherein the initial distribution has a lowest score among the candidate distributions.

3. The method of claim 2, wherein the objective function is a summation of multiplications of bandwidth weights for each pair of service instances by the number of connection hops that separate the pair of service instances in the candidate distributions.

4. The method of claim 1, further comprising, based on a first set of one or more constraints not being satisfied and a second plurality of candidate distributions satisfying a second set of one or more constraints, evaluating a fallback objective function to determine scores for the second plurality of candidate distributions based on a number of the service instances placed at the NICs, wherein the initial distribution has a highest number of service instances placed at the NICs.

5. The method of claim 1, further comprising:
   receiving, at the edge services controller, an indication of an additional service;
   determining, at the edge services controller, an incremental distribution for the additional service; and
   distributing one or more instances of the additional service to at least one of the NICs of the NIC fabric according to the incremental distribution.

6. The method of claim 5, further comprising:
   based on a plurality of candidate distributions satisfying a set of one or more constraints, each of the plurality of candidate distributions assigning the additional service to one of the NICS, evaluating an objective function to determine scores for the plurality of candidate distributions based on one or more attributes of the candidate distributions,
   wherein for each of the plurality of candidate distributions, the attributes of the candidate distributions of the plurality of candidate distributions include bandwidth weights of connections between pairs of service instances and a number of connection hops between the pairs of service instances, and
   wherein the incremental distribution has a lowest score among the plurality of candidate distributions.

7. The method of claim 5, further comprising, based on a set of one or more constraints not being satisfied by any candidate distribution and one or more candidate distributions satisfying a further set of one or more constraints, selecting one of the further set of one or more candidate distributions as the incremental distribution.

8. The method of claim 1, further comprising:
   determining, at the edge services controller, a rebalanced distribution for the service instances; and
   redistributing the service instances to the NICs of the NIC fabric according to the rebalanced distribution.

9. The method of claim 8, further comprising determining at least one pinned service instance at a specific NIC, wherein redistributing the service instances keeps the at least one pinned service instance at the specific NIC.

10. The method of claim 8, further comprising, before distributing the service instances to the NICs of the NIC fabric according to the rebalanced distribution, determining that an improvement of the rebalanced distribution is above an objective threshold and determining that utilization of the NIC fabric is below a utilization threshold.

11. An edge services controller comprising:
    a memory; and
    a processor implemented in circuitry and configured to:
       receive a list of services to be placed at network interface cards (NICs) of a NIC fabric;
       determine an initial distribution of service instances of the services to be placed at the NICs considering at least service central processing unit (CPU) utilization of the NICs and service data processing unit (DPU) utilization of the NICs; and
       distribute the service instances to the NICs of the NIC fabric according to the initial distribution.

12. The edge services controller of claim 11, wherein to determine the initial distribution of the service instances the processor is further configured to:
    based on a plurality of candidate distributions satisfying a set of one or more constraints:
       evaluate an objective function to determine scores for the candidate distributions based on one or more attributes of the candidate distributions, wherein for each of the candidate distributions:
          the attributes of the candidate distributions include bandwidth weights of connections between service instances of the candidate distribution and a number of connection hops between nodes of the candidate distribution; wherein the initial distribution has a lowest score among the candidate distributions.

13. The edge services controller of claim 12, wherein the objective function is a summation of a multiplications of bandwidth weights for each pair of service instances by the number of connection hops that separate the pair of service instances in the candidate distributions.

14. The edge services controller of claim 11, wherein the processing circuitry is further configured to, based on a first set of one or more constraints not being satisfied and a second plurality of candidate distributions satisfying a second set of one or more constraints, evaluate a fallback objective function to determine scores for the second plurality of candidate distributions based on a number of the service instances placed at the NICs, wherein the initial distribution has a highest number of service instances placed at the NICs.

15. The edge services controller of claim 11, wherein the processing circuitry is further configured to:
receive an indication of an additional service;
determine, an incremental distribution for the additional service; and
distribute one or more instances of the additional service to at least one of the NICs of the NIC fabric according to the incremental distribution.

16. The edge services controller of claim 15, wherein the processing circuitry is further configured to:
based on a plurality of candidate distributions satisfying a set of one or more constraints, each of the plurality of candidate distributions assigning the additional service to one of the NICS, evaluate an objective function to determine scores for the plurality of candidate distributions based on one or more attributes of the candidate distributions,
wherein for each of the plurality of candidate distributions, the attributes of the candidate distributions of the plurality of candidate distributions include bandwidth weights of connections between pairs of service instances and a number of connection hops between the pairs of service instances, and
wherein the incremental distribution has a lowest score among the plurality of candidate distributions.

17. The edge services controller of claim 15, wherein the processor is further configured to, based on a set of one or more constraints not being satisfied by any candidate distribution and one or more candidate distributions satisfying a further set of one or more constraints, select one of the further set of one or more candidate distributions as the incremental distribution.

18. The edge services controller of claim 11, wherein the processing circuitry is further configured to:
determine a rebalanced distribution for the service instances; and
redistribute the service instances to the NICs of the NIC fabric according to the rebalanced distribution.

19. The edge services controller of claim 18, wherein the processor is further configured to determine at least one pinned service instance at a specific NIC, wherein the processor is configured to redistribute the service instances but keep the at least one pinned service instance at the specific NIC.

20. A system comprising:
a network interface card (NIC) fabric comprising NICs coupled by communication links in a NIC fabric; and
an edge services controller comprising processing circuitry having access to storage media, the edge services controller configured to:
receive a list of services to be placed at the NICs of the NIC fabric;
determine an initial distribution of service instances of the services to be placed at the NICs considering at least service central processing unit (CPU) utilization of the NICs and service data processing unit (DPU) utilization of the NICs; and
distribute the service instances to the NICs of the NIC fabric according to the initial distribution.

* * * * *